United States Patent
Ohta et al.

(10) Patent No.: US 9,974,128 B2
(45) Date of Patent: May 15, 2018

(54) LIGHT SOURCE LIGHTING CIRCUIT AND TURN SIGNAL LAMP

(71) Applicant: KOITO MANUFACTURING CO., LTD., Minato-ku, Tokyo (JP)

(72) Inventors: Shinji Ohta, Shizuoka (JP); Masahiro Sawada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/539,237

(22) PCT Filed: Dec. 16, 2015

(86) PCT No.: PCT/JP2015/085214
§ 371 (c)(1),
(2) Date: Jun. 23, 2017

(87) PCT Pub. No.: WO2016/104282
PCT Pub. Date: Jun. 30, 2016

(65) Prior Publication Data
US 2017/0359869 A1    Dec. 14, 2017

(30) Foreign Application Priority Data

Dec. 24, 2014  (JP) .................................. 2014-260986
Dec. 24, 2014  (JP) .................................. 2014-260987
(Continued)

(51) Int. Cl.
B60Q 1/38      (2006.01)
H05B 33/08    (2006.01)

(52) U.S. Cl.
CPC ......... H05B 33/0815 (2013.01); B60Q 1/382 (2013.01); H05B 33/089 (2013.01); H05B 33/0827 (2013.01)

(58) Field of Classification Search
CPC ............... H05B 33/08; H05B 33/0815; H05B 33/0827; H05B 33/089; B60Q 1/38;
(Continued)

(56) References Cited

U.S. PATENT DOCUMENTS 7,002,458 B2 *  2/2006  Su ........................ B60Q 1/2665
                                                         340/463
8,823,265 B2 *  9/2014  Rice ........................ B60Q 1/38
                                                         315/291
(Continued)

FOREIGN PATENT DOCUMENTS

JP          651453 B2     7/1994
JP        20015539 A      1/2001
(Continued)

OTHER PUBLICATIONS

International Search Report dated Mar. 15, 2016 by the International Searching Authority in counterpart International Application No. PCT/JP2015/085214 (PCT/ISA/210).
(Continued)

*Primary Examiner* — Thai Pham
(74) *Attorney, Agent, or Firm* — Sughrue Mion, PLLC

(57) ABSTRACT

A light source lighting circuit comprises a first lighting circuit for receiving current from the electric power supply line and supplying drive current to a first light source and a second lighting circuit for receiving the current from the electric power supply line and supplying drive current to a second light source. When a state of the drive current flowing to the first light source shows an abnormality, or when state of the drive current flowing to the second light source shows an abnormality, the first lighting circuit stops operation. When a state of the drive current flowing to the second light source shows an abnormality, or when a state of
(Continued)

the drive current flowing to the first light source shows an abnormality, the second lighting circuit stops operation.

16 Claims, 13 Drawing Sheets

(30) Foreign Application Priority Data

Dec. 26, 2014 (JP) .................................. 2014-264284
Apr. 27, 2015 (JP) .................................. 2015-090386

(58) Field of Classification Search
CPC . B60Q 1/34; B60Q 1/343; B60Q 1/26; B60Q 2300/14; B60Q 2300/142; B60Q 2300/146
See application file for complete search history.

(56) References Cited

U.S. PATENT DOCUMENTS

| | | |
|---|---|---|
| 2003/0227257 A1 | 12/2003 | Serizawa et al. |
| 2006/0082332 A1 | 4/2006 | Ito et al. |
| 2008/0007180 A1* | 1/2008 | Kesterson ............ B60Q 1/2603 315/82 |
| 2013/0127340 A1 | 5/2013 | Huhn et al. |
| 2016/0156152 A1* | 6/2016 | Ichikawa ........... H05B 33/0815 315/294 |
| 2016/0167569 A1* | 6/2016 | Kizaki ................... B60Q 1/343 340/475 |

FOREIGN PATENT DOCUMENTS

| | | |
|---|---|---|
| JP | 2002362220 A | 12/2002 |
| JP | 20049825 A | 1/2004 |
| JP | 2005132256 A | 5/2005 |
| JP | 2006103477 A | 4/2006 |
| JP | 2006172819 A | 6/2006 |

OTHER PUBLICATIONS

Written Opinion dated Mar. 15, 2016 by the International Searching Authority in counterpart International Application No. PCT/JP2015/085214 (PCT/ISA/237).

* cited by examiner

LIGHT SOURCE LIGHTING CIRCUIT AND TURN SIGNAL LAMP

CROSS-REFERENCE TO RELATED APPLICATION

The present application claims the benefit of priority of Japanese Patent Applications No. 2014-260986, filed on Dec. 24, 2014, No. 2014-260987, filed on Dec. 24, 2014, No. 2014-264284, filed on Dec. 26, 2014 and No. 2015-090386, filed on Apr. 27, 2015, the disclosures of which are incorporated herein by reference.

TECHNICAL FIELD

The present invention relates to a technology field of a light source lighting circuit configured to turn on a light source on the basis of electric power supplied from a vehicle-side and a turn signal lamp having the light source lighting circuit and the light source.

RELATED ART

As a vehicle lamp, a turn signal lamp configured to function as a direction indicator has been known. The turn signal lamp includes a left and front turn signal lamp and a right and front turn signal lamp provided at left and right sides of a front end portion of a vehicle and a left and rear turn signal lamp and a right and rear turn signal lamp provided at left and right sides of a rear end portion of the vehicle, and is ON/OFF controlled by a predetermined in-vehicle ECU (Electronic Control Unit) such as a meter ECU, in response to operations of a winker lever, a hazard switch and the like by a driver.

An ECU having four ports for supplying electric power to the four turn signal lamps has been known. In this case, the ECU is configured to individually determine whether there is disconnection for each of the four turn signal lamps. The disconnection determination is performed by determining whether a supply current value is below a predetermined threshold value, for each port.

Regarding the disconnection determination for the turn signal lamp, Patent Document 1 discloses a technology for diverting a determination threshold value for a turn signal lamp in which an incandescent lamp is a light source, to a turn signal lamp in which an LED (light emitting diode) is a light source. Specifically, Patent Document 1 discloses a technology of connecting an electric power consuming unit to a port of an ECU in parallel with the LED and reducing power consumption of the electric power consuming unit when disconnection of the LED is detected. Since the power consumption of the LED is less than the incandescent lamp, the supply current value through the port is smaller, as compared to a case where the incandescent lamp is used. For this reason, when the LED is used, a difference between the supply current values of the port in a normal state where the disconnection does not occur and in a disconnection state is small, so that it is not possible to appropriately determine whether or not the disconnection if the determination threshold value for incandescent lamp is used, as it is (it is erroneously determined that the disconnection is normal). Therefore, in the normal state where the disconnection does not occur, load current is enabled to flow in a pseudo manner by the electric power consuming unit, so that the supply current value from the port is made to be equivalent to the case where the incandescent lamp is used, and upon the disconnection, the power consumption by the electric power consuming unit is reduced to highly lower the supply current value from the port, so that the difference between the supply current values in the normal state and in the disconnection state is made to be equivalent to the case where the incandescent lamp is used. Thereby, the disconnection determination where the determination threshold value for incandescent lamp is used as it is can be performed.

Also, Patent Document 2 discloses a technology of enabling an the electric power consuming unit (a pseudo-load unit) to consume electric power in a normal state and to reduce power consumption of a current consuming unit in a disconnection state for the purpose of diversion of a disconnection determination threshold value for incandescent lamp when an LED is used as a light source, like Patent Document 1. Patent Document 2 discloses that a plurality of LEDs is provided and the power consumption of the electric power consuming unit is reduced when the disconnection is detected for any one LED.

According to the above related art, when changing the turn signal lamp from the incandescent lamp to the LED, it is possible to divert the ECU for performing the disconnection determination, as it is. Therefore, when it is intended to reduce the power consumption of the turn signal lamp, it is possible to suppress the cost-up.

Also, as the turn signal lamp, for example, Patent Document 3 and Patent Document 4 disclose a turn signal lamp in which a plurality of light sources aligned from an inner side to an outer side in a width direction of a vehicle is sequentially turned on, which is a sequential lighting.

SUMMARY OF THE INVENTION

Problems to be Solved

For example, when changing a model of the vehicle, an ECU in which a threshold value for LED is set as the disconnection determination threshold value may be newly mounted. When the threshold value for LED is used, it is not necessary to make the supply current value from the port equivalent to the case where the incandescent lamp is used. Therefore, it is considered that it is not necessary to provide the pseudo-load such as the electric power consuming unit upon the disconnection determination.

However, even when the threshold value for LED is used, it may not possible to appropriately perform the disconnection determination, depending on the configuration of the turn signal lamp. Specifically, the turn signal lamp, particularly, the left and rear turn signal lamp and the right and rear turn signal lamp to be arranged at the rear side may be dispersedly formed in two housings, not one housing. In other words, one set of the two lamp units configures each of the left and rear turn signal lamp and the right and rear turn signal lamp. In this case, since light emitting units are respectively arranged in the separate lamp units, lighting circuits of the light emitting units are also arranged in the separate lamp units, respectively.

In the above case, when the ECU having the four ports is used, each of the two ports allotted to the rear side supplies the electric power to the two lamp units (the lighting circuits). In other words, the two lamp units of each turn signal lamp are supplied with the electric power by commonly using one corresponding port.

In this case, the ECU determines that there is disconnection if any one of the two lamp units configuring each of the left and rear turn signal lamp and the right and rear turn signal lamp is disconnected. Specifically, the ECU determines whether each turn signal lamp is disconnected by determining whether the supply current values from the left and rear port and the right and rear port are below the threshold value, which is set in correspondence to the supply current value when one lamp unit is disconnected.

At this time, however, it should be noted that the supply current value from the port is not constant, i.e., may fluctuate depending on fluctuation in an input voltage from an in-vehicle battery or may be varied due to the other causes. Due to the fluctuation and variation, a lower limit value of the supply current value in the normal state where the disconnection does not occur and an upper limit value of the supply current value in the disconnection state of one lamp unit may come close to each other or lap each other (i.e., the values may become the same value or the relation of the upper and lower limit values may be reversed). In the case where the values lap each other, it is not possible to perform the disconnection determination even when any threshold value is set. Also, in the case where the values come close to each other, it is not possible to perform the disconnection determination if a difference between the two values is small. In order to perform the disconnection determination by using the threshold value, the difference between both the values, which are comparison targets, is required to be equal or larger than a predetermined value, based on the detection precision of the supply current value. Therefore, when the values come close to each other in such a level that the difference is less than the predetermined value, both the values are detected as the same value, so that it is not possible to appropriately perform the disconnection determination.

Like this, according to the configuration where the turn signal lamp consists of the two lamp units and the lighting circuits provided in the respective lamp units are supplied with the electric power from one common port of the ECU, it may not be possible to appropriately perform the disconnection determination even when any determination threshold value is set.

It is therefore a first object of the present invention to appropriately perform disconnection determination for a vehicle lamp provided with a first lamp unit and a second lamp unit each of which is configured to receive electric power supply from a common electric power supply line.

Also, a turn signal lamp, particularly, a left and rear turn signal lamp and a right and rear turn signal lamp to be arranged at a rear side may be dispersedly formed in two housings, not one housing, and light emitting units thereof may be dispersedly arranged in separate housings, respectively.

Like this, in each of the left and rear turn signal lamp and the right and rear turn signal lamp of which the light emitting units are dispersedly arranged in the separate housings, sequential lighting is performed in order from a light emitting unit (hereinafter, referred to as "first light emitting unit") arranged closely to an inner side of a vehicle to a light emitting unit (hereinafter, referred to as "second light emitting unit") arranged closely to an outer side of the vehicle. Specifically, after light sources aligned in the first light emitting unit are sequentially turned on in a direction from the inner side towards the outer side of the vehicle, a light source in the second light emitting unit is turned on.

In order to implement the above sequential lighting, it is considered to provide a lighting circuit of the first light emitting unit with a timing generation circuit (timer circuit) for sequentially turning on the light sources at a predetermined time interval and to provide a lighting circuit of the second light emitting unit with a timing generation circuit for standing by for a time period until all the light sources of the first light emitting unit are turned on.

However, when each lighting circuit is provided with the timing generation circuit, a deviation may be caused with respect to connection of the sequential lighting from the first light emitting unit to the second light emitting unit due to variation in characteristics of each timing generation circuit.

It is therefore a second object of the present invention to prevent deviation in connection of the sequential lighting from the first light emitting unit to the second light emitting unit.

Also, like hazard lighting of a vehicle lamp, for example, the turn signal lamp, a pair of lamps of which electric power supply from the vehicle-side is individually controlled may repeat simultaneous lighting with a relatively short period.

The hazard lighting may be continued for a relatively long time period during stop of the vehicle, for example. In particular, it can be said that the tendency increases in a commercial vehicle such as a truck.

As described above, in the lamp having the electric power consuming unit so as to cope with the ECU of the related art based on the assumption of the incandescent lamp, when the hazard lighting is continued for a relatively long time period at a state where an engine stops, for example, a possibility that a battery will be dead increases. In addition to this, since an amount of heat generation may be excessively increased in the lamp, it is required to take measures against the heat in the lamp, which increases the cost.

It is therefore a third object of the present invention to perform disconnection determination upon lighting of one lamp for a pair of lamps of which electric power supply from a vehicle-side is individually controlled, to reduce power consumption and an amount of heat generation when both lamps are turned on, to decrease a possibility that a battery will be dead in the vehicle, and to reduce the manufacturing cost of the lamp.

Means for Solving Problems

A light source lighting circuit of the first invention for achieving the first object is a light source lighting circuit provided with a first lighting circuit configured to receive current from an electric power supply line and to supply drive current to a first light source and a second lighting circuit configured to receive current from the electric power supply line and to supply drive current to a second light source. The first lighting circuit is configured to generate a first state signal corresponding to a state of the drive current flowing to the first light source and to output a second notification signal corresponding to the first state signal to the second lighting circuit, and the second lighting circuit is configured to generate a second state signal corresponding to a state of the drive current flowing to the second light source and to output a first notification signal corresponding to the second state signal to the first lighting circuit. When the first state signal indicates an abnormality or when the first notification signal indicates an abnormality, the first lighting circuit stops operation thereof. When the second state signal indicates an abnormality or when the second notification signal indicates an abnormality, the second lighting circuit stops operation thereof.

With this configuration, when disconnection occurs in at least one of the first light source and the second light source, both the first lighting circuit and the second lighting circuit stop operations thereof. In other words, when disconnection occurs in at least one of the first light source and the second light source, the supply current to the light source lighting circuit becomes substantially zero (0), so that a difference between supply current values in a normal state and in the disconnection state increases.

In the light source lighting circuit of the first invention, the first lighting circuit may include a current consuming unit configured to enable regulating current to flow by consuming a part of the electric power to be supplied from the electric power supply line, and may reduce a current value of the regulating current when the first state signal indicates an abnormality or when the first notification signal indicates an abnormality.

With the configuration, the supply current value of the electric power supply line is increased in the normal state.

In the light source lighting circuit of the first invention, preferably, the first lighting circuit includes a first DC/DC converter having a first switching element, and the second lighting circuit includes a second DC/DC converter having a second switching element.

The DC/DC converter has a relatively less amount of heat generation.

Also, a turn signal lamp of the first invention includes a first lamp unit attached to a door part provided to be freely openable and closable for a vehicle main body part at a rear end portion of a vehicle, and a second lamp unit attached to the vehicle main body part-side and positioned at an outer-more side than the first lamp unit in a width direction of the vehicle. The first lamp unit includes a first light emitting unit and the first lighting circuit of the light source lighting circuit of the first invention, and the second lamp unit includes a second light emitting unit and the second lighting circuit of the light source lighting circuit of the first invention.

With this configuration, it is possible to appropriately perform the disconnection determination for the turn signal lamp in which the respective lamp units are dispersedly arranged at the vehicle main body part and the door part.

A light source lighting circuit of the second invention for achieving the second object is a light source lighting circuit provided with a first lighting circuit configured to turn on a plurality of light sources of a first light emitting unit on the basis of an input voltage and a second lighting circuit configured to turn on a light source of the second light emitting unit on the basis of an input voltage. The first lighting circuit is configured to sequentially turn on the light sources of the first light emitting unit in accordance with a timing signal and to output the timing signal to the second lighting circuit, and the second lighting circuit is configured to start lighting of the light source of the second light emitting unit in accordance with the timing signal.

With this configuration, the sequential lighting in the first light emitting unit and the lighting start in the second light emitting unit are controlled in accordance with the common timing signal.

In the light source lighting circuit of the second invention, the second light emitting unit may include a plurality of light sources, and the second lighting circuit may be configured to start sequential lighting of the light sources in the second light emitting unit in accordance with the timing signal.

With this configuration, the sequential lighting of the light sources in the second light emitting unit starts at appropriate timing, following the sequential lighting of the light sources in the first light emitting unit.

In the light source lighting circuit of the second invention, the first lighting circuit and the second lighting circuit may be configured to receive current from a common electric power supply line and to turn on the corresponding light sources, the first lighting circuit may be configured to generate a state signal corresponding to drive current flowing to the light sources of the first light emitting unit and to output a notification signal corresponding to the state signal to the second lighting circuit, the second lighting circuit may stop operation thereof or reduce a current value of regulating current flowing to a current consuming unit configured to consume a part of electric power to be supplied from the electric power supply line when the notification signal indicates an abnormality, and the first lighting circuit may be configured to output the timing signal through an output line of the notification signal.

With this configuration, it is not necessary to provide a separate output line of the timing signal in the configuration of stopping the operation of the second lighting circuit or reducing the current value of the regulating current, in correspondence to occurrence of the disconnection in the first light emitting unit.

In the light source lighting circuit of the second invention, preferably, the first lighting circuit includes a first DC/DC converter having a first switching element, and the second lighting circuit includes a second DC/DC converter having a second switching element.

The DC/DC converter has a relatively less amount of heat generation.

Also, a turn signal lamp of the second invention includes a first lamp unit attached to a door part provided to be freely openable and closable for a vehicle main body part at a rear end portion of a vehicle, and a second lamp unit attached to the vehicle main body part-side and positioned at an outer-more side than the first lamp unit in a width direction of the vehicle. The first lamp unit includes the first lighting circuit and the first light emitting unit of the light source lighting circuit of the second invention, and the second lamp unit includes the second lighting circuit and the second light emitting unit of the light source lighting circuit of the second invention.

With this configuration, it is possible to prevent a lighting operation from being destabilized in the turn signal lamp where the respective lamp units are dispersedly arranged at the vehicle main body part and the door part.

Also, a light source lighting circuit of the third invention for achieving the first object is a light source lighting circuit provided with a first lighting circuit configured to receive current from an electric power supply line and to supply drive current to a first light source and a second lighting circuit configured to receive current from the electric power supply line and to supply drive current to a second light source, and includes a first current consuming unit provided for the first lighting circuit and configured to consume a part of the electric power to be supplied from the electric power supply line and to enable first regulating current to flow. The first lighting circuit is configured to generate a first state signal corresponding to a state of the drive current flowing to the first light source and to output a second notification signal corresponding to the first state signal to the second lighting circuit, and the second lighting circuit is configured to generate a second state signal corresponding to a state of the drive current flowing to the second light source and to output a first notification signal corresponding to the second state signal to the first lighting circuit. When the first state signal indicates an abnormality or when the first notification signal indicates an abnormality, the first lighting circuit lowers a current value of the first regulating current.

With this configuration, a difference between the supply current values through a common electric power supply line in a normal state where both the lamp units are not disconnected and in a disconnection state where at least one lamp unit is disconnected is increased.

The light source lighting circuit of the third invention may keep the first lighting circuit at a state where a light emission driving of the first light source is possible when the first state signal does not indicate an abnormality even though the first notification signal indicates an abnormality.

With this configuration, the lamp unit in which the disconnection has not occurred is kept at a state where the lighting circuit can turn on the light source in correspondence to the electric power supply from the electric power supply line.

The light source lighting circuit of the third invention may be provided with only the first current consuming unit, as a current consuming unit.

With this configuration, the number of the current consuming units provided for the vehicle lamp is minimized.

The light source lighting circuit of the third invention may include a second current consuming unit provided for the second lighting circuit and configured to consume a part of the electric power to be supplied from the electric power supply line and to enable second regulating current to flow, the first lighting circuit may be configured to output a second notification signal corresponding to the first state signal to the second lighting circuit, and the second lighting circuit may lower a current value of the second regulating current when the second state signal indicates an abnormality or when the second notification signal indicates an abnormality.

With this configuration, the current consuming units are dispersedly arranged in the two lamp units.

In the light source lighting circuit of the third invention, preferably, the first lighting circuit includes a first DC/DC converter having a first switching element, and the second lighting circuit includes a second DC/DC converter having a second switching element.

The DC/DC converter has a relatively less amount of heat generation.

Also, a turn signal lamp of the third invention includes a first lamp unit attached to a door part provided to be freely openable and closable for a vehicle main body part at a rear end portion of a vehicle, and a second lamp unit attached to the vehicle main body part-side and positioned at an outermore side than the first lamp unit in a width direction of the vehicle. The first lamp unit includes a first light emitting unit and the first lighting circuit of the light source lighting circuit of the third invention, and the second lamp unit includes a second light emitting unit and the second lighting circuit of the light source lighting circuit of the third invention.

With this configuration, it is possible to appropriately perform the disconnection determination for the turn signal lamp in which the respective lamp units are dispersedly arranged at the vehicle main body part and the door part.

Also, since a light emitting frequency of the turn signal lamp is relatively low, a chance that the electric power will be consumed by the current consuming unit is also relatively low.

Also, a light source lighting circuit of the fourth invention for achieving the third object is a light source lighting circuit provided for a pair of lamps of which electric power supply from a vehicle-side is individually controlled, and includes a light source driving unit configured to enable drive current to flow to a light source on the basis of the electric power to be supplied from the vehicle-side, a current consuming unit configured to consume a part of the electric power to be supplied from the vehicle-side and to enable regulating current to flow, and a current regulation circuit configured to receive a drive state signal corresponding to a state of the drive current and a mode signal indicative of a lighting/lights-out state of the other lamp from the other lamp and to lower a current value of the regulating current in each of a case where the drive state signal indicates an abnormality and a case where the mode signal indicates a lighting state.

With this configuration, in each of the pair of lamps, the current value of the regulating current is lowered when the lamp is in a disconnection state. Thereby, a difference between the supply current values from the vehicle-side (ECU-side) is increased. That is, when one of the lamps is turned on such as turn lighting, it is possible to appropriately perform the disconnection determination by the ECU of the related art based on the assumption of an incandescent lamp.

Further, according to the above configuration, when the pair of lamps is turned on at the same time, the electric power consumption in both the lamps is reduced as the current value of the regulating current is lowered. That is, it is possible to reduce the electric power consumption in both the lamps, in correspondence to a case where the simultaneous lighting such as hazard lighting is periodically repeated (or the simultaneous lighting may continue) for a relatively long time period.

In the light source lighting circuit of the fourth invention, the current regulation circuit may be configured to use the mode signal for regulating the regulating current via an insulation-type signal transmission element.

With this configuration, when an abnormality such as a shortcut occurs in a transmission path of the mode signal, it is possible to exclude an influence of the abnormality. Also, it is possible to block an extraneous noise occurring in the transmission path, so that it is possible to prevent a malfunction caused due to the noise.

Also, a turn signal lamp of the fourth invention may include the light source lighting circuit and the light source of the fourth invention, and the light source lighting circuit may be configured to branch a power supply voltage to be supplied from the vehicle-side and to output the same to the other lamp, as a mode signal indicative of a lighting/lights-out state of the lamp.

With this configuration, it is possible to reduce the power consumption and the amount of heat generation upon the hazard lighting. Also, a configuration for notifying whether or not it is a lighting state between both the lamps can be made by the configuration of branching and outputting the power supply voltage from the vehicle-side.

Effects of the Invention

According to the first or third invention, it is possible to appropriately perform the disconnection determination for the vehicle lamp having the first lamp unit and the second lamp unit each of which is configured to receive the electric power to be supplied from the common electric power supply line.

According to the second invention, it is possible to prevent a deviation from occurring in connection of the sequential lighting from the first light emitting unit to the second light emitting unit.

According to the fourth invention, while it is possible to perform the disconnection determination at the vehicle-side upon the lighting of one lamp for the pair of lamps of which the electric power supply from the vehicle-side is individually controlled, it is possible to reduce the power consumption and the amount of heat generation when both the lamps are turned on at the same time, to decrease a possibility that a battery will be dead in the vehicle, and to reduce the manufacturing cost of the lamp.

DETAILED DESCRIPTION OF ILLUSTRATIVE EMBODIMENTS

First Illustrative Embodiment

Hereinafter, a turn signal lamp having a light source lighting circuit of an illustrative embodiment will be described with reference to the accompanying drawings.

Meanwhile, in below descriptions, "turn signal lamp" is abbreviated to "turn lamp".

First, an example of a turn lamp system configured to perform lighting control and disconnection determination for a left and front turn lamp FtL, a right and front turn lamp FtR, a left and rear turn lamp BtL and a right and rear turn lamp BtR is described with reference to FIG. 1.

The system is provided with a turn lamp ECU (Electronic Control Unit) 100 for performing lighting control and disconnection determination for the turn lamps FtL, FtR, BtL, BtR. The turn lamp ECU 100 has four ports of ports p1 to p4, and the left and front turn lamp FtL is connected to the port p1, the right and front turn lamp FtR is connected to the port p2, the left and rear turn lamp BtL is connected to the port p3 and the right and rear turn lamp BtR is connected to the port p4, as shown.

The turn lamp ECU 100 is configured to input an output voltage B (hereinafter, referred to as "battery voltage B: 12V, in the first illustrative embodiment) from an in-vehicle battery and to ON/OFF control (for example ON=350 ms, OFF=350 ms) a supply of the battery voltage B to the turn lamps FtL, FtR, BtL, BtR connected to the ports p1, p2, p3, p4 with a predetermined period, in response to an operation of a winker lever, a hazard switch or the like (not shown), for example, thereby performing lighting control (blinking control) of the turn lamps FtL, FtR, BtL, BtR.

Also, the turn lamp ECU 100 is configured to detect a current value from the port p for a time period in which the supply of the battery voltage B is ON and to determine whether the detected current value is below a predetermined threshold value, for each port p, thereby performing disconnection determination for each of the turn lamps FtL, FtR, BtL, BtR.

At this time, the turn lamp ECU 100 is configured to set an ON/OFF period of the battery voltage B to be supplied shorter than a usual state (a state where disconnection does not occur) for the turn lamp for which a disconnection state is determined (for example, sets an OF/OFF frequency substantially two times higher than the usual state).

Figure 2:
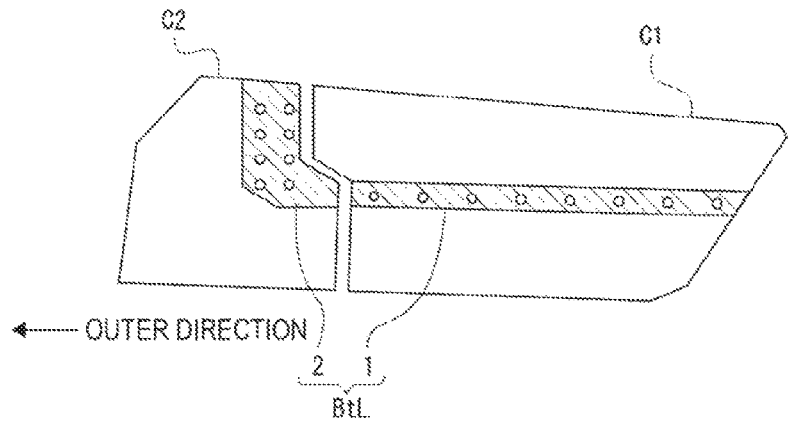
FIG. 2 illustrates an outward configuration of a turn signal lamp of an illustrative embodiment.

FIG. 2 illustrates an outward configuration of the left and rear turn lamp BtL and the right and rear turn lamp BtR of the illustrative embodiment. Meanwhile, in FIG. 2, the outward configuration of the left and rear turn lamp BtL is depicted by a schematic front view. In the meantime, the outward configuration of the right and rear turn lamp BtR is bilaterally symmetric to the outward configuration of the left and rear turn lamp BtL shown in FIG. 2 and is not shown.

The left and rear turn lamp BtL includes an inner lamp unit 1 provided in an inner housing C1 and an outer lamp unit 2 provided in an outer housing C2. The outer housing C2 is arranged closely to an outer side in a width direction of a vehicle (a vehicle width direction) with respect to the inner housing C1. In this case, the inner lamp unit 1 is attached to a door part (for example a trunk lid or a rear hatch door) provided to be freely openable and closable for a vehicle main body part at a rear end portion of the vehicle, and the outer lamp unit 2 is attached to the vehicle main body part-side.

Figure 3:
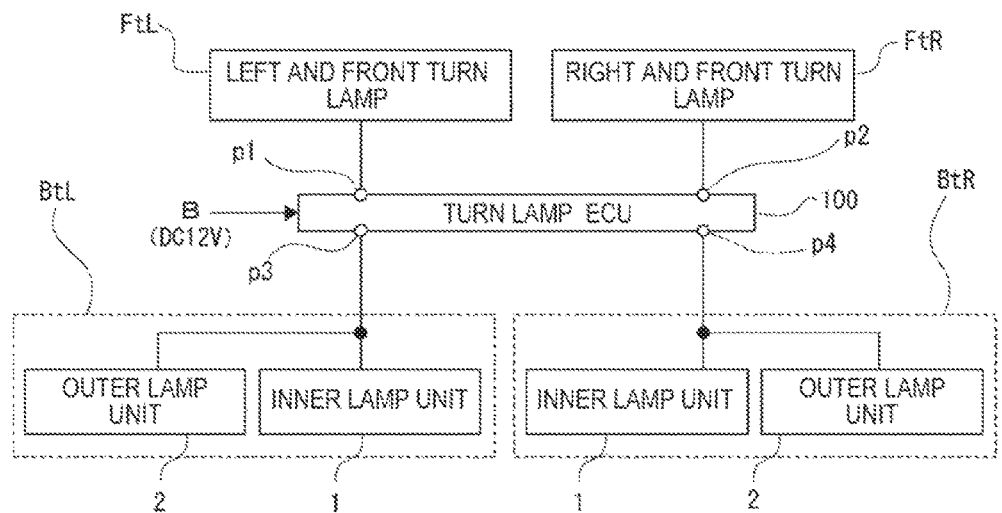
FIG. 3 depicts a configuration outline of a turn lamp system of an illustrative embodiment.

FIG. 3 depicts a configuration outline of the turn lamp system in which the left and rear turn lamp BtL and the right and rear turn lamp BtR each of which has the inner lamp unit 1 and the outer lamp unit 2 are used.

Figure 1:
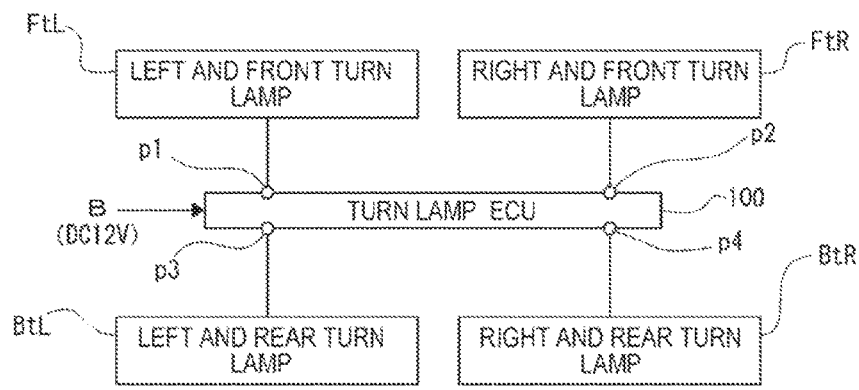
FIG. 1 illustrates an example of a turn lamp system in which lighting control and disconnection determination are performed for a turn signal lamp.

In the turn lamp system of the first illustrative embodiment, the turn lamp ECU 100 having the four ports shown in FIG. 1 is used. In the turn lamp ECU 100, the inner lamp unit 1 and the outer lamp unit 2 configuring the left and rear turn lamp BtL are connected to the port p3, and the inner lamp unit 1 and the outer lamp unit 2 configuring the right and rear turn lamp BtR are connected to the port p4. That is, the inner lamp unit 1 and the outer lamp unit 2 configuring the left and rear turn lamp BtL are configured to enable light sources to emit lights on the basis of electric power to be supplied from the common port p3, and the inner lamp unit 1 and the outer lamp unit 2 configuring the right and rear turn lamp BtR are configured to enable light sources to emit lights on the basis of electric power to be supplied from the common port p4.

Herein, for the turn lamp having the two lamp units as described above, a disconnection state is determined when disconnection occurs in at least one of the two lamp units. Specifically, the turn lamp ECU 100 is configured to perform the disconnection determination for the left and rear turn lamp BtL and the right and rear turn lamp BtR by determining whether a supply current value from each of the ports p3, p4 is below a threshold value, which is set in correspondence to a supply current value when one of the inner lamp unit 1 and the outer lamp unit 2 is disconnected.

At this time, however, it cannot be said that the supply current value from the port p is always constant. Specifically, the supply current value from the port p fluctuates in association with fluctuation in the battery voltage B. Also, the supply current value from the port p may be varied due to factors such as variation in voltage/current of a light source configuring the turn lamp, a difference of a light emission driving circuit configuration of the light source (for example, when a switching power supply circuit such as a DC/DC converter (which will be described later) is used for the light emission driving circuit, variation in input current value in association with variation in the battery voltage B is relatively large), and the like.

Figure 4:
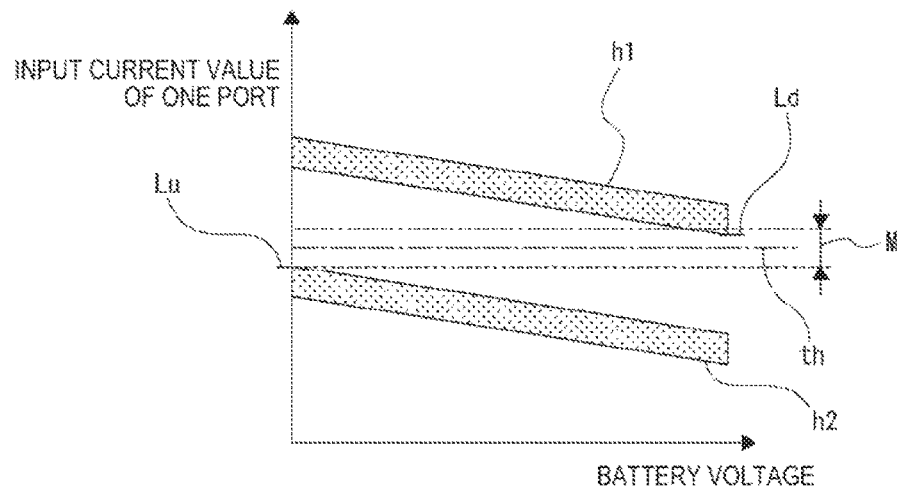
FIG. 4 illustrates influences of fluctuation and variation in supply current value from a port of an ECU.

FIG. 4 illustrates influences of fluctuation and variation in the supply current value from the port p, and pictorially depicts, as change characteristics of the supply current value (input current value) of one port with respect to change in the battery voltage B, a change characteristic h1 in a normal state where both the inner lamp unit 1 and the outer lamp unit 2 are not disconnected and a change characteristic h2 in a disconnection state where any one of the inner lamp unit 1 and the outer lamp unit 2 is disconnected.

Meanwhile, in FIG. 4, vertical widths of the change characteristics h1, h2 indicate widths of the variations. Also, a fluctuation range of the battery voltage B is a range of 10V to 16V, for example.

In order to perform the disconnection determination, a determination threshold value th should be set between a lower limit value Ld of the supply current value in the normal state indicated by the change characteristic h1 and an upper limit value Lu of the supply current value in the disconnection state where any one of the inner lamp unit 1 and the outer lamp unit 2 is disconnected, which is indicated by the change characteristic h2.

However, the lower limit value Ld and the upper limit value Lu may come close to each other due to the fluctuation and variation and a difference thereof may be reduced. Also, in some cases, the lower limit value Ld and the upper limit value Lu may lap each other. In the case where the lower limit value Ld and the upper limit value Lu lap each other, it is not possible to perform the disconnection determination even when any threshold value th is set. Also, in the case where the lower limit value Ld and the upper limit value Lu come close to each other, it is not possible to perform the disconnection determination if a difference between the two values is small. In order to perform the disconnection determination by using the threshold value th, it is necessary to secure a margin M (for example, a margin of about ±0.25 A on the basis of the threshold value th), based on the detection precision of the supply current value. In a case where the difference between the upper limit value Lu and the lower limit value Ld is less than the margin M, both the values are detected as equal, so that it is not possible to appropriately perform the disconnection determination (in FIG. 4, an example where the difference between the upper limit value Lu and the lower limit value Ld is less than the margin M is shown).

As described later, in the first illustrative embodiment, LEDs (light emitting diodes) are used as the light sources of the inner lamp unit 1 and the outer lamp unit 2. However, when the LED is used, an amount of change in the input current value associated with the disconnection is relatively small. Therefore, a possibility that the lower limit value Ld and the upper limit value Lu will come close to each other or lap each other increases.

In the above, the inner lamp unit 1 and the outer lamp unit 2 have substantially the same lamp specification (the number of light sources and the drive current value). On the other hand, in the case where the lamp specifications are different, amounts of change in the supply current value associated with the disconnection are different when the disconnection occurs in the inner lamp unit 1 and when the disconnection occurs in the outer lamp unit 2. Due to this, the lower limit value Ld and the upper limit value Lu come close to each other or lap each other. That is, in this case, the upper limit value Lu is an upper limit value of the supply current value when the disconnection occurs in the lamp unit of which the power consumption is small (the amount of change in the supply current value associated with the disconnection is small). Therefore, when the lamp unit of which the power consumption is large is considered as a reference, the upper limit value Lu is likely to come close to or lap with the lower limit value Ld.

In the first illustrative embodiment, in order to appropriately perform the disconnection determination even when the lower limit value Ld and the upper limit value Lu come close to each other or lap each other, when the disconnection of at least one of the inner lamp unit 1 and the outer lamp unit 2 is detected, the lighting circuits of both the inner lamp unit 1 and the outer lamp unit 2 stop operations thereof.

Figure 5:
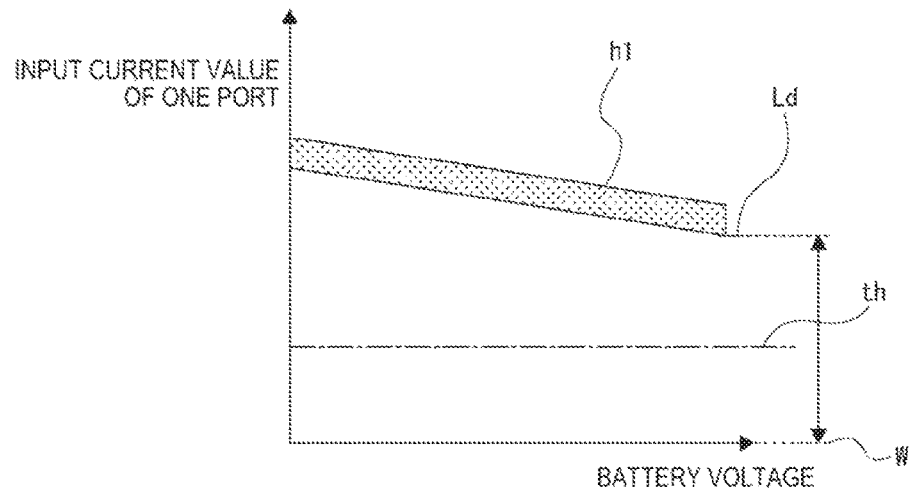
FIG. 5 illustrates an action that is to be obtained when adopting a method of a first illustrative embodiment.

FIG. 5 illustrates an action that is to be obtained when adopting the method of stopping the operations of both the lighting circuits. The change characteristic h1 in the normal state where the disconnection does not occur is the same as FIG. 4. As described above, both the lighting circuits are enabled to stop the operations thereof when the disconnection of at least one of the inner lamp unit 1 and the outer lamp unit 2 is detected. Thereby, the supply current value upon the disconnection detection in any one lamp unit is substantially zero (0), as indicated with "W" in FIG. 5.

For this reason, it is possible to secure a difference equal to or greater than the margin M between the lower limit value Ld and the supply current value, so that it is possible to appropriately perform the disconnection determination by the turn lamp ECU 100.

In the below, a specific circuit configuration for implementing the above method is described with reference to a circuit diagram of FIG. 6.

Figure 6:
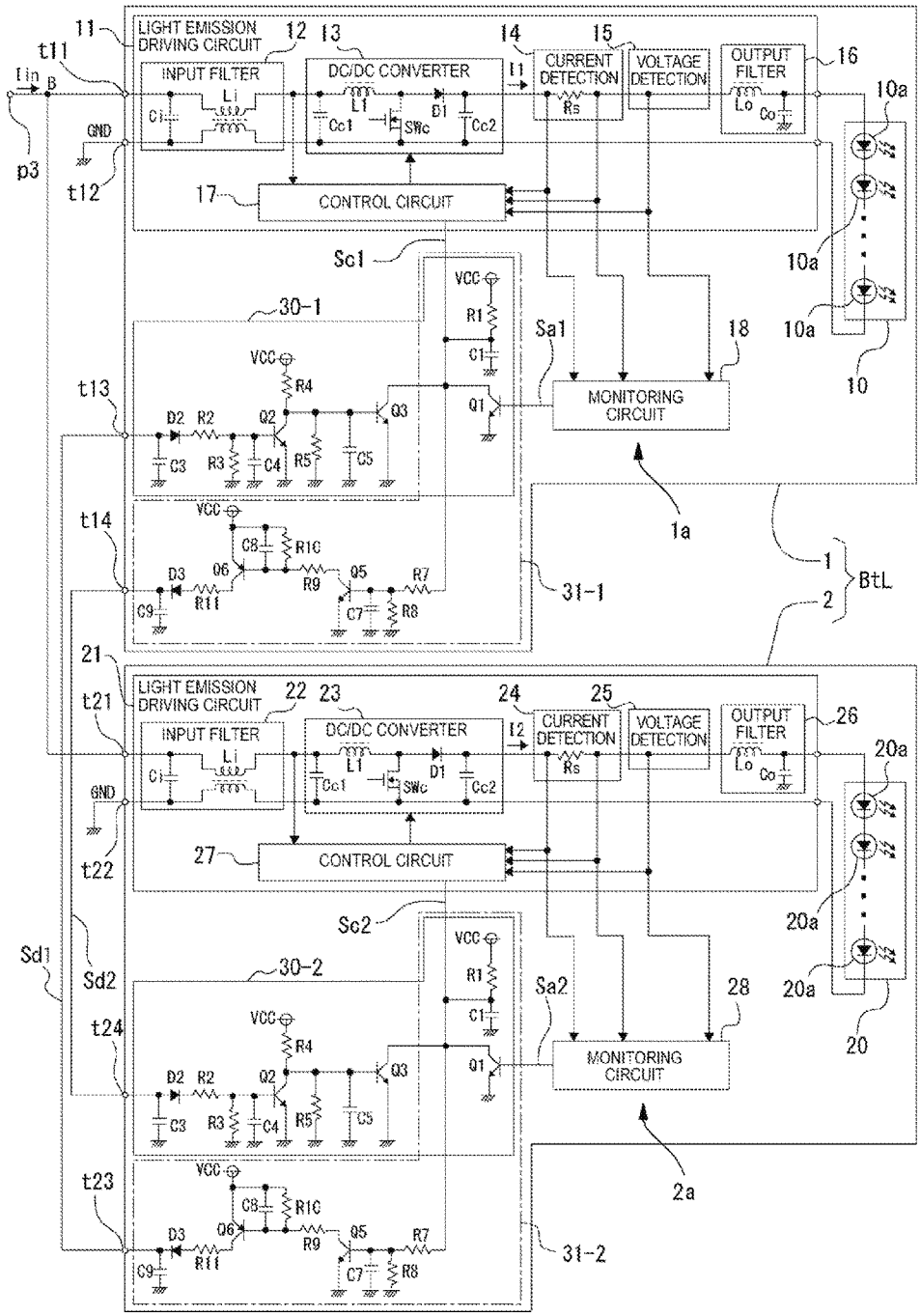
FIG. 6 is a circuit diagram depicting a circuit configuration in the turn signal lamp having a light source lighting circuit of the first illustrative embodiment.

Meanwhile, FIG. 6 depicts an internal circuit configuration of the left and rear turn lamp BtL. However, an internal circuit configuration of the right and rear turn lamp BtR is the same as that of FIG. 6 and the overlapping descriptions are omitted.

In FIG. 6, the inner lamp unit 1 includes a lighting circuit 1a having a light emitting unit 10 having light emitting elements 10a as light sources, a light emission driving circuit 11 configured to enable the light emitting elements 10a of the light emitting unit 10 to emit lights on the basis of the battery voltage B to be input from the port p3, a monitoring circuit 18 configured to monitor drive current I1 flowing to the light emitting elements 10a and to generate a state signal Sa1, an operation stop control circuit 30-1, and a notification signal output circuit 31-1.

Also, the inner lamp unit 1 is provided with a positive electrode-side input terminal t11 connected to a positive electrode-side of the battery voltage B, a GND terminal t12 grounded to the earth, a notification signal input terminal t13, which is a terminal for inputting a notification signal Sd1 (which will be described later) to be output through a notification signal output terminal t23 from the outer lamp unit 2, and a notification signal output terminal t14, which is a terminal for outputting a notification signal Sd2 from the notification signal output circuit 31-1 to a notification signal input terminal t24 of the outer lamp unit 2. The notification signal input terminal t13 and the notification signal output terminal t14 are respectively connected to the notification signal output terminal t23 and the notification signal input terminal t24 via harness.

The light emission driving circuit 11 includes an input filter 12, a DC/DC converter 13, a current detection circuit 14, a voltage detection circuit 15, an output filter 16 and a control circuit 17.

The input filter 12 has a noise filter including a capacitor Ci having one end connected to the positive electrode-side input terminal t11 and the other end connected to the GND terminal t12 and a choke coil Li, and is configured to remove a common-mode noise that is to be generated in the input voltage. The choke coil Li includes a first coil and a second coil, and the first coil has one end connected to a connection point of one end of the capacitor Ci and the positive electrode-side input terminal t11, and the second coil has one end connected to a connection point of the other end of the capacitor Ci and the GND terminal t12.

The DC/DC converter 13 is configured as a switching regulator having a coil or transformer, a capacitor, a diode and a switching element, and is configured to DC-DC convert an input voltage input via the input filter 12 and to thereby generate an output voltage for enabling the light emitting elements 10a of the light emitting unit 10 to emit the lights. The DC/DC converter 13 of the first illustrative embodiment is a boost-type switching regulator, and includes a capacitor Cc1 having one end connected to the other end of the first coil of the input filter 12 and the other end connected to a connection line (negative electrode-side line) with the GND terminal t12, a coil L1 having one end connected to one end of the capacitor Cc1, a diode D1 having an anode connected to the other end of the coil L1, a capacitor Cc2 having one end connected to a cathode of the diode D1 and the other end connected to the negative electrode-side line, and a switching element SWc. The switching element SWc is an N-type MOSFET (Metal-Oxide-Semiconductor Field-Effect Transistor), for example, and has a drain connected to a connection point of the other end of the coil L1 and the anode of the diode D1, a source connected to the negative electrode-side line and a gate connected to the control circuit 17.

In the meantime, the DC/DC converter 13 may also be a drop-type or a boost/drop switching type.

The current detection circuit 14 has a current detection resistance Rs for detecting a current value of the drive current I1. The current detection resistance Rs has one end connected to a connection point of the cathode of the diode D1 of the DC/DC converter 13 and one end of the capacitor Cc2, and the other end connected to the light emitting unit 10 via the voltage detection circuit 15 and the output filter 16. One end and the other end of the current detection resistance Rs are provided with taps, respectively, and outputs of the taps are input to the control circuit 17 and the monitoring circuit 18 and are used to detect each current value.

In the voltage detection circuit 15, a tap for detecting a voltage value of the output voltage of the DC/DC converter 13 is provided between the current detection circuit 14 and the output filter 16, and an output of the tap is input to the control circuit 17 and the monitoring circuit 18.

The output filter 16 is a filter circuit (low-pass filter circuit) having a choke coil Lo and a capacitor Co, for example, and is configured to remove a high-frequency component that is to be generated in the output voltage of the DC/DC converter 13.

The light emitting unit 10 has a serial connection circuit having a plurality of light emitting elements 10a connected in series. In the first illustrative embodiment, LEDs are used as the light emitting elements 10a, an anode of the LED located at a tip end of the serial connection circuit is connected to the output filter 16, and a cathode of the LED located at the other tip end is connected to the negative electrode-side line of the light emission driving circuit 11. The number of LEDs as the light emitting elements 10a is eight, for example.

The output voltage of the DC/DC converter 13 is applied to the light emitting unit 10, in correspondence to the electric power supply from the port p3, so that each light emitting element 10a emits the light and the drive current I1 flows.

The control circuit 17 is an IC (Integrated Circuit) for driving light sources, for example, and the input voltage to the DC/DC converter 13 is branched and supplied as an operating voltage to the control circuit. The control circuit 17 is configured to detect the current value of the drive current I1 on the basis of the input from the current detection circuit 14 and to control an ON/OFF duty of the switching element SWc of the DC/DC converter 13 on the basis of a detection result of the current value so that the current value of the drive current I1 coincides with a predetermined reference value, thereby performing constant current control for the drive current I1.

In the meantime, the control circuit 17 is input with a control signal Sc1 from the operation stop control circuit 30-1. An operation of the control circuit 17 corresponding to the control signal Sc1 will be described later.

The monitoring circuit 18 is configured to detect the current value of the drive current I1 and a voltage value of the output voltage of the DC/DC converter 13 on the basis of an input from the current detection circuit 14 and an input from the voltage detection circuit 15, and to generate a state signal Sa1 indicative of a state of the drive current I1 on the basis of the detection results. When disconnection has occurred in the light emitting unit 10, the current value of the drive current I1 becomes zero (0). Also, when a shortcut has occurred in the light emitting unit 10, the output voltage of the DC/DC converter 13 becomes zero (0). The monitoring circuit 18 is configured to detect, as an abnormality, a state where the current value of the drive current I1 is zero or the output voltage of the DC/DC converter 13 is zero, and raises the state signal Sa1 to an H level when an abnormality is detected.

The operation stop control circuit 30-1 is configured to output the control signal Sc1 based on the state signal Sa1 output from the monitoring circuit 18 and the notification signal Sd1 from the outer lamp unit 2 to the control circuit 17 of the light emission driving circuit 11.

The operation stop control circuit 30-1 has a transistor Q1, a resistance R1, a capacitor C1, a capacitor C3, a diode D2, a resistance R2, a resistance R3, a capacitor C4, a transistor Q2, a resistance R4, a resistance R5, a capacitor C5 and a transistor Q3.

The transistor Q1 is an NPN-type bipolar transistor, for example, and has a base connected to a supply line of the state signal Sa1 from the monitoring circuit 18. A collector of the transistor Q1 is connected to a connection point of the resistance R1 and the capacitor C1, and an emitter thereof is grounded. The resistance R1 and the capacitor C1 are inserted in series between the power supply voltage VCC and the earth, the resistance R1 is connected to a power supply voltage VCC and the capacitor C1 is grounded, as shown.

In the meantime, the power supply voltage VCC is a voltage input by branching the battery voltage B input from the positive electrode-side input terminal t11.

The connection point of the resistance R1 and the capacitor C1 and a connection point with the collector of the transistor Q1 are connected to the control circuit 17, so that an output line of the control signal Sc1 to the control circuit 17 is formed.

The capacitor C3 is inserted between the notification signal input terminal t13 and the earth, and an anode of the diode D2 is connected to a connection point of the notification signal input terminal t13 and the capacitor C3. A cathode of the diode D2 is connected to one end of the resistance R2, and the other end of the resistance R2 is connected to a base of the transistor Q2, which is an NPN-type bipolar transistor, for example. Also, a parallel connection circuit of the resistance R3 and the capacitor C4 is inserted between the other end of the resistance R2 and the earth.

A collector of the transistor Q2 is connected to the power supply voltage VCC via the resistance R4, and an emitter thereof is grounded. A base of the transistor Q3, which is an NPN-type bipolar transistor, for example, is connected to a connection point of the collector of the transistor Q2 and the resistance R4. Also, a parallel connection circuit of the resistance R5 and the capacitor C5 is inserted between the connection point of the collector of the transistor Q2 and the resistance R4 and the earth.

A collector of the transistor Q3 is connected to the connection point of the resistance R1 and the capacitor C1 and the connection point with the collector of the transistor Q1, and an emitter thereof is grounded.

The notification signal output circuit 31-1 shares a circuit configured by the transistor Q1, the resistance R1 and the capacitor C1 of the operation stop control circuit 30-1, and has a resistance R7, a resistance R8, a capacitor C7, a transistor Q5, a resistance R9, a resistance R10, a capacitor C8, a transistor Q6, a resistance R11, a diode D3 and a capacitor C9.

The resistance R7 has one end connected to the connection point of the resistance R1 and the capacitor C1 and the connection point with the collector of the transistor Q1 and the other end connected to a base of the transistor Q5, which is an NPN-type bipolar transistor, for example. A parallel connection circuit of the resistance R8 and the capacitor C7 is inserted between a connection point of the base of the transistor Q5 and the resistance R7 and the earth.

A collector of the transistor Q5 is connected to the power supply voltage VCC via the resistance R9 and the resistance R10, and an emitter thereof is grounded. A connection point of the resistance R9 and the resistance R10 is connected to a base of the transistor Q6, which is PNP-type bipolar transistor, for example, and an emitter of the transistor Q6 is connected to the power supply voltage VCC. Also, the capacitor C8 is inserted between the base and the emitter of the transistor Q6.

A collector of the transistor Q6 is connected to an anode of the diode D3 via the resistance R11, and a cathode of the diode D3 is connected to the notification signal output terminal t14. The capacitor C9 is inserted between a connection point of the cathode of the diode D3 and the notification signal output terminal t14 and the earth.

Subsequently, a circuit configuration of the outer lamp unit 2 is described.

The outer lamp unit 2 includes a lighting circuit 1a having a light emitting unit 20 having light emitting elements 20a as light sources, a light emission driving circuit 21 configured to enable the light emitting elements 20a of the light emitting unit 20 to emit lights on the basis of the battery voltage B to be input from the port p3, a monitoring circuit 28 configured to monitor drive current I2 flowing to the light emitting elements 20a and to generate a state signal Sa2, an operation stop control circuit 30-2 and a notification signal output circuit 31-2.

Also, the outer lamp unit 2 is provided with a positive electrode-side input terminal t21 connected to the positive electrode-side of the battery voltage B, a GND terminal t22 grounded to the earth, a notification signal output terminal t23, which is a terminal for outputting a notification signal Sd1 from the notification signal output circuit 31-2 to the inner lamp unit 1, and a notification signal input terminal t24, which is a terminal for inputting a notification signal Sd2, which is to be output by the inner lamp unit 1.

The light emission driving circuit 21 has an input filter 22, a DC/DC converter 23, a current detection circuit 24, a voltage detection circuit 25, an output filter 26 and a control circuit 27. Also, the light emitting unit 20 has a serial connection circuit having a plurality of light emitting elements 20a connected in series, and LEDs are used as the light emitting elements 20a. In the first illustrative embodiment, the number of the light emitting elements 20a of the light emitting unit 20 is eight, for example, like the light emitting unit 10.

In the meantime, since the configurations and connections of the input filter 22, the DC/DC converter 23, the current detection circuit 24, the voltage detection circuit 25, the output filter 26, the control circuit 27, the light emitting unit 20 and the monitoring circuit 28 are the same as those of the input filter 12, the DC/DC converter 13, the current detection circuit 14, the voltage detection circuit 15, the output filter 16, the control circuit 17, the light emitting unit 10 and the monitoring circuit 18 of the inner lamp unit 1, the overlapping descriptions thereof are omitted.

Also, the configurations of the operation stop control circuit 30-2 and the notification signal output circuit 31-2 are the same as those of the operation stop control circuit 30-1 and the notification signal output circuit 31-1.

In the notification signal output circuit 31-2, the connection point of the cathode of the diode D3 and the capacitor C9 is connected to the notification signal output terminal t23, so that the notification signal Sd1 can be output to the inner lamp unit 1-side.

In the operation stop control circuit 30-2, the state signal Sa2 from the monitoring circuit 28 is input to the base of the transistor Q1. Also, the connection point of the resistance R1 and the capacitor C1 and the connection point with the collector of the transistor Q1 are connected to the control circuit 27, so that an output line of the control signal Sc2 to the control circuit 27 is formed. Also, in the operation stop control circuit 30-2, the connection point of the capacitor C3 and the anode of the diode D2 is connected to the notification signal input terminal t24, so that the notification signal Sd2 from the inner lamp unit 1 can be input.

The operations of the operation stop control circuits 30-1, 30-2 and the notification signal output circuits 31-1, 31-2 having the above configurations are described.

First, the operations of the operation stop control circuit 30-1 and the notification signal output circuit 31-2 are described.

In the outer lamp unit 2, when the disconnection has not occurred in the light emitting unit 20 and the state signal Sa2 of the monitoring circuit 28 does not indicate an abnormality (L level), the transistor Q1 becomes OFF, so that the base current based on the power supply voltage VCC flows to the transistor Q5 and the transistor Q5 becomes ON. When the transistor Q5 becomes ON, the base current based on the power supply voltage VCC flows to the PNP-type transistor Q6, so that the transistor Q6 becomes ON, too. In this way, the transistor Q6 becomes ON, so that the current flows from the notification signal output terminal t23 towards the notification signal input terminal t13 of the inner lamp unit 1. That is, when the disconnection is not detected, the notification signal Sd1 becomes an H level.

On the other hand, when the state signal Sa2 of the monitoring circuit 28 indicates an abnormality (an H level) as the disconnection occurs, the transistor Q1 becomes ON, so that the transistor Q5 becomes OFF and the transistor Q6 becomes OFF, too. Thereby, when the disconnection (an abnormality) is detected, the current does not flow to the notification signal input terminal t13 and the notification signal Sd1 to the notification signal input terminal t13 becomes an L level.

Continuously, in the operation stop control circuit 30-1, when the state signal Sa1 of the monitoring circuit 18 does not indicate an abnormality (L level), the transistor Q1 becomes OFF.

Also, when the notification signal Sd1 from the outer lamp unit 2 to the notification signal input terminal t13 does not indicate an abnormality, since the current flows to the notification signal input terminal t13, the transistor Q2 becomes ON, so that the base current based on the power supply voltage VCC does not flow to the transistor Q3 and the transistor Q3 becomes OFF.

Like this, in the inner lamp unit 1, in the normal state where an abnormality is not detected by the monitoring circuit 18 and the notification signal Sd1 from the outer lamp unit 2 does not indicate an abnormality, both the transistor Q1 and the transistor Q3 become OFF. Both the transistor Q1 and the transistor Q3 become OFF, so that the current based on the power supply voltage VCC flows to the control circuit 17 via the resistance R1. That is, in the normal state, the control signal Sc1 that is to be input to the control circuit 17 is an H level.

On the other hand, when the state signal Sa1 indicates an abnormality (H level) as the disconnection occurs in the light emitting unit 10, the transistor Q1 becomes ON.

Also, when the notification signal Sd1 to the notification signal input terminal t13 becomes an L level as the disconnection occurs in the light emitting unit 20, the transistor Q2 becomes OFF and the transistor Q3 becomes ON.

In this way, when the transistor Q1 or the transistor Q3 becomes ON, the current based on the power supply voltage VCC does not flow to the control circuit 17 via the resistance R1 and the control signal Sc1 becomes an L level.

When the control signal Sc1 is an L level, the control circuit 17 stops the operation of the DC/DC converter 13. Specifically, the control unit stops the operation of the DC/DC converter 13 by keeping the switching element SWc at the OFF state. Thereby, after an abnormality such as disconnection is detected, even when the electric power is supplied from the port p3, the DC/DC converter 13 is kept at the operation stop state.

The operations of the notification signal output circuit 31-1 in the inner lamp unit 1 and the operation stop control circuit 30-2 and the control circuit 27 in the outer lamp unit 2 are the same as those of the notification signal output circuit 31-2, the operation stop control circuit 30-1 and the control circuit 17. That is, in the outer lamp unit 2, when the state signal Sa2 indicates an abnormality (H level) as the disconnection occurs in the light emitting unit 20, the transistor Q1 becomes ON, and when the notification signal Sd2 to the notification signal input terminal t14 becomes an L level as the disconnection occurs in the light emitting unit 10, the transistor Q3 becomes ON and the control signal Sc2 is dropped from an H level to an L level, so that the control circuit 28 stops the operation of the DC/DC converter 23.

As described above, in the first illustrative embodiment, when the disconnection occurs in at least one of the inner lamp unit 1 and the outer lamp unit 2, both the DC/DC converter 13 and the DC/DC converter 23 stop the operations thereof and the supply current value from the port p3 is substantially zero (0).

Therefore, it is possible to increase a difference between the supply current values in the normal state and in the disconnection state to the margin M or greater.

Figure 7:
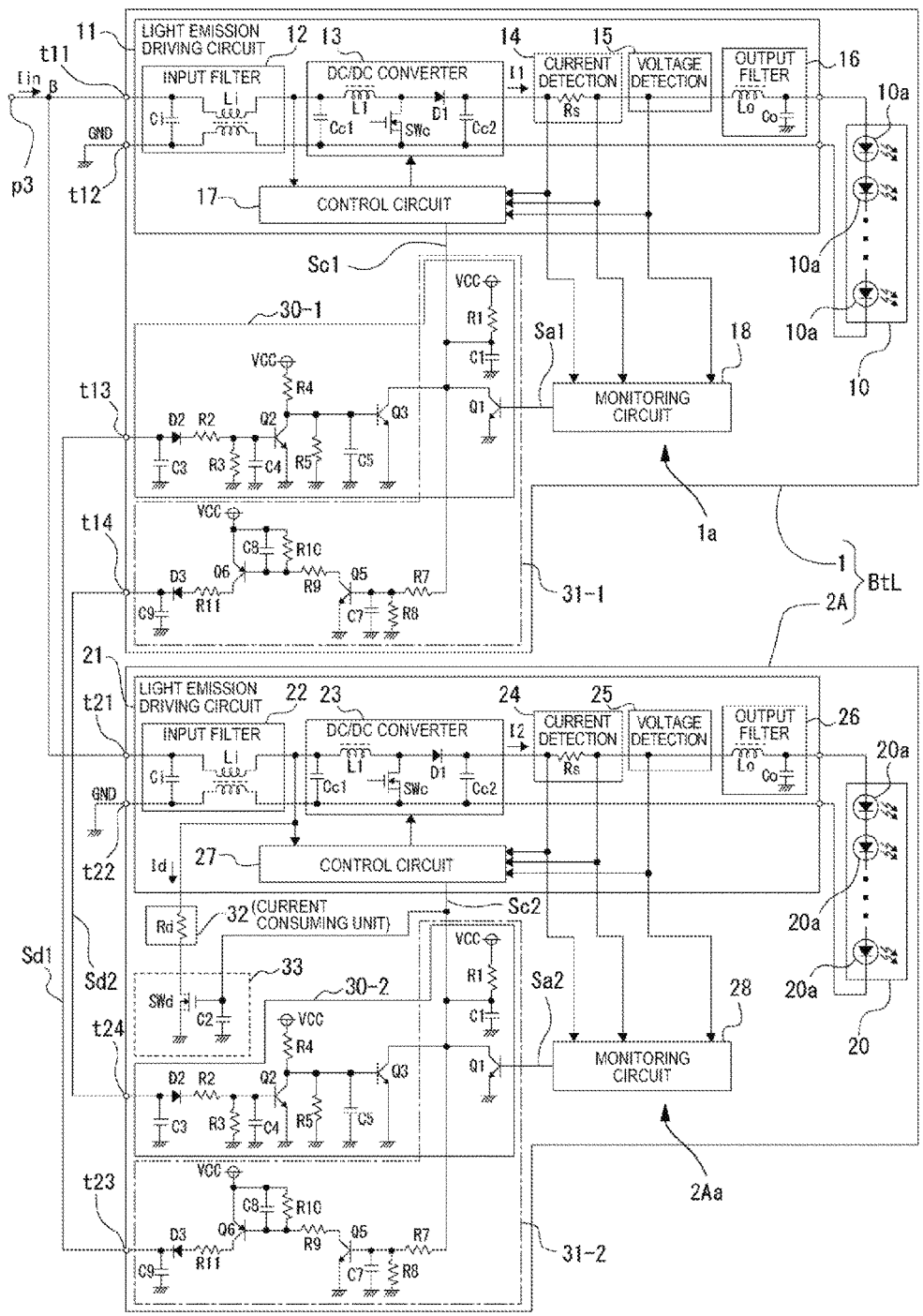
FIG. 7 is a circuit diagram for illustrating a modified embodiment of the first illustrative embodiment.

FIG. 7 is a circuit diagram for illustrating a modified embodiment of the first illustrative embodiment.

In the modified embodiment, a current consuming unit 32 configured to consume a part of the electric power, which is to be supplied from the electric power supply line extending from the port p3, and to enable regulating current Id to flow and a current regulation circuit 33 configured to regulate the regulating current Id are added.

In below descriptions, the same parts as the above are denoted with the same reference numerals and the descriptions thereof are omitted.

FIG. 7 depicts an example where the current consuming unit 32 and the current regulation circuit 33 are provided for the outer lamp unit 2. The outer lamp unit 2 to which the current consuming unit 32 and the current regulation circuit 33 are added is denoted as "outer lamp unit 2A".

In the lighting circuit 2Aa of the outer lamp unit 2A, the current consuming unit 32 is provided as a pseudo-load for the light emission driving circuit 21 and is configured to enable the regulating current Id (pseudo-load current: dummy current) to flow to the light emission driving circuit 21. In this modified embodiment, the current consuming unit 32 is configured to consume the electric power by a dummy resistance Rd. The dummy resistance Rd has one end connected to the connection point of the other end of the first coil of the input filter 22 and one end of the coil L1 of the DC/DC converter 23. For this reason, it is possible to enable the regulating current Id to flow to the light emission driving circuit 21, in correspondence to the electric power supply from the port p3.

The current regulation circuit 33 is configured to control a current value of the regulating current Id on the basis of the control signal Sc2 from the operation stop control circuit 30-2. The current regulation circuit 33 is provided with a switch SWd, which is configured by an N-type MOSFET, for example, and the capacitor C2, and a drain of the switch SWd is connected to the other end of the dummy resistance Rd and a source thereof is grounded. The capacitor C2 is inserted between a gate of the switch SWd and the earth, and a connection point of the capacitor C2 and the gate of the switch SWd is connected to the connection point of the resistance R1 and the capacitor C1 and the connection point with the collector of the transistor Q1.

In the outer lamp unit 2A, the control signal Sc2 becomes an H level in the normal state where the disconnection does not occur and becomes an L level when the disconnection occurs in at least one of the inner lamp unit 1 and the outer lamp unit 2A, as can be understood from the above descriptions.

In the normal state where the control signal Sc2 is an H level, the switch SWd is ON, so that the regulating current Id flows. On the other hand, when the control signal Sc2 becomes an L level due to the disconnection, the switch SWd becomes OFF and the regulating current Id is stopped.

Like this, the current consuming unit 32 and the current regulation circuit 33 are added, so that the current is consumed by the current consuming unit 32 and the supply current value from the port p3 increases in the normal state. On the other hand, when at least one of the inner lamp unit 1 and the outer lamp unit 2A is disconnected, the operations of the DC/DC converter 13, 23 are stopped by the operation stop control circuits 30-1, 30-2, so that the supply current value from the port p3 becomes substantially zero (0).

Therefore, as the regulating current Id is added, it is possible to further increase the difference between the supply current values in the normal state and in the disconnection state of any one lamp unit.

The above configuration is particularly favorable in the case where it is not possible to sufficiently secure the difference between the supply current values simply by stopping the operations of the DC/DC converters 13, 23 when the LEDs of which the power consumption is small are used.

As a specific example, the consumption current values of the inner lamp unit 1 and the outer lamp unit 2A except for the regulating current Id are assumed to be the same within a range of 1.3 A to 0.3 A. In this example, if the current consuming unit 32 and the current regulation circuit 33 are not provided, the upper limit value of the change characteristic h1 is 1.3 A×2=2.6 A and the lower limit value Ld thereof is 0.3 A×2=0.6 A in the normal state shown in FIG. 4.

In contrast, in the configuration shown in FIG. 7, it is assumed that the current value of the regulating current Id is set to 0.4 A. According to this configuration, the upper limit value of the change characteristic h1 is 1.3 A×2+0.4 A=3.0 A and the lower limit value Ld is 0.3 A×2+0.4 A=1.0 A in the normal state.

Therefore, in this case, the difference between the supply current values in the normal state and in the disconnection state of one lamp unit is substantially 1.0 A (1.0 A–about 0 A), so that it is possible to secure the sufficient supply current value difference of the margin M (for example, ±0.25 A) or greater.

In the meantime, when the resistance element is used to generate the regulating current Id, like the example of FIG. 7, the current value of the regulating current Id fluctuates depending on the fluctuation of the battery voltage B. However, since the change characteristics of the current value of the regulating current Id and the supply current value from the port p3 resulting from the fluctuation of the battery voltage B are opposite to each other, it is easy to increase the supply current value difference in the normal state and in the disconnection state of one lamp unit. Specifically, while the supply current value from the port p3 decreases as the battery voltage B increases, the current value of the regulating current Id increases as the battery voltage B increases. Therefore, it is possible to improve the effect of raising the lower limit value Ld.

In the meantime, the current consuming unit 32 and the current regulation circuit 33 may be provided for the inner lamp unit 1 or for both the inner lamp unit 1 and the outer lamp unit 2.

In any case, it is possible to further increase the supply current value difference in the normal state and in the disconnection state of one lamp unit.

At this time, when the current consuming unit 32 and the current regulation circuit 33 are provided for only one lamp unit, it is possible to minimize the number of components to be added with respect to the effect of raising the lower limit value Ld by the regulating current Id, which contributes to the cost saving.

Also, when the current consuming unit 32 and the current regulation circuit 33 are provided for both the lamp units, it is possible to dispersedly arrange the current consuming unit 32 in the respective lamp units. Since the current consuming unit 32 consumes the supplied electric power as heat, if the current consuming unit 32 is mounted on only one lamp unit, the amount of heat generation increases, so that it is necessary to secure a space in the lamp unit, as countermeasures against heat, which may cause a design restriction of the lamp unit. However, when the current consuming units 32 can be dispersedly arranged in the two lamp units, as described above, it is possible to reduce the space, as countermeasures against heat, so that it is possible to relax the design restriction.

In the above, the case where the current value of the regulating current Id is lowered to zero (0) has been exemplified. However, the amount of decrease in the regulating current Id is arbitrary and is not limited to zero (0).

Also, in the above, the case where the resistance element is used to generate the regulating current Id has been exemplified. However, in addition to the resistance element, a constant current circuit using a transistor, for example, may also be used without particular limit inasmuch as it is a means for consuming the electric power.

As described above, the light source lighting circuit of the first illustrative embodiment is a light source lighting circuit including a first lighting circuit (a part including at least the light emission driving circuit 11 except for the light emitting unit 10 of the circuit in the inner lamp unit 1) configured to receive current from an electric power supply line and to supply drive current to a first light source (the light emitting elements 10a) and a second lighting circuit (a part including at least the light emission driving circuit 21 except for the light emitting unit 20 of the circuit in the outer lamp unit 2 or 2A) configured to receive current from the electric power supply line and to supply drive current to a second light source (the light emitting elements 20a), and includes a first monitoring circuit (18) provided for the first lighting circuit and configured to monitor a state of the drive current (I1) flowing to the first light source and to generate a first state signal (Sa1) and a second monitoring circuit (28) provided for the second lighting circuit and configured to monitor a state of the drive current (I2) flowing to the second light source and to generate a second state signal (Sa2).

Also, the light source lighting circuit includes a first notification signal output circuit (31-1) provided for the second lighting circuit and configured to output a first notification signal (Sd1) corresponding to the second state signal to the first lighting circuit and a second notification signal output circuit (31-2) provided for the first lighting circuit and configured to output a second notification signal (Sd2) corresponding to the first state signal to the second lighting circuit.

Also, the light source lighting circuit includes a first control unit (the operation stop control circuit 30-1), which is provided for the first lighting circuit, the first state signal and the first notification signal are to be input thereto and stops the operation of the first lighting circuit when the first state signal indicates an abnormality or when the first notification signal indicates an abnormality, and a second control unit (the operation stop control circuit 30-2), which is provided for the second lighting circuit, the second state signal and the second notification signal are to be input thereto and stops the operation of the second lighting circuit when the second state signal indicates an abnormality or when the second notification signal indicates an abnormality.

Therefore, the first lighting circuit is configured to generate the first state signal (Sa1) corresponding to the state of the drive current flowing to the first light source (the light emitting elements 10a) and to output the second notification signal (Sd2) corresponding to the first state signal to the second lighting circuit.

The second lighting circuit is configured to generate the second state signal (Sa2) corresponding to the state of the drive current flowing to the second light source (the light emitting elements 20a) and to output the first notification signal (Sd1) corresponding to the second state signal to the first lighting circuit.

The first lighting circuit stops the operation thereof when the first state signal indicates an abnormality or when the first notification signal indicates an abnormality, and the second lighting circuit stops the operation thereof when the second state signal indicates an abnormality or when the second notification signal indicates an abnormality.

With the above configuration, the difference between the supply current values in the common electric power supply line in the normal state where both the lamp units are not disconnected and in the disconnection state where at least one lamp unit is disconnected is increased, so that it is possible to appropriately perform the disconnection determination by the turn lamp ECU 100.

Also, the light source lighting circuit of the first illustrative embodiment includes a current consuming unit (32) provided for the first lighting circuit and configured to consume a part of the electric power, which is to be supplied from the electric power supply line, and to enable regulating current (Id) to flow, and a current regulation circuit (33) that is provided for the first lighting circuit and lowers a current value of the regulating current when the first state signal indicates an abnormality or when the first notification signal indicates an abnormality.

Therefore, the first lighting circuit lowers the current value of the regulating current when the first state signal (Sa1) indicates an abnormality or when the first notification signal (Sd1) indicates an abnormality.

With the above configuration, the supply current value of the electric power supply line is raised in the normal state.

Therefore, it is possible to further increase the supply current value difference in the normal state and in the disconnection state of one lamp unit, so that it is possible to appropriately perform the disconnection determination by the turn lamp ECU 100.

Also, in the light source lighting circuit of the first illustrative embodiment, the first lighting circuit includes a first DC/DC converter (13) having a first switching element, and the second lighting circuit includes a second DC/DC converter (23) having a second switching element.

The DC/DC converter has a relatively less amount of heat generation. Therefore, it is possible to simplify the configuration for countermeasures against heat, so that it is possible to suppress an increase in cost.

Also, the turn signal lamp of the first illustrative embodiment includes a first lamp unit attached to a door part provided to be freely openable and closable for a vehicle main body part at a rear end portion of a vehicle, and a second lamp unit attached to the vehicle main body part-side and positioned at an outermore side than the first lamp unit in a width direction of the vehicle. The first lamp unit includes the first lighting circuit and the first light emitting unit of the light source lighting circuit of the first illustrative embodiment, and the second lamp unit includes the second lighting circuit and the second light emitting unit of the light source lighting circuit of the first illustrative embodiment.

With the above configuration, it is possible to appropriately perform the disconnection determination by the turn lamp ECU 100 for the turn signal lamp in which the respective lamp units are dispersedly arranged at the vehicle main body part and the door part.

Also, since a lighting frequency of the turn signal lamp is relatively low, a chance that the electric power will be consumed by the current consuming unit 32 described in the modified embodiment of FIG. 7 is also relatively low, which is advantageous to the power consumption.

Second Illustrative Embodiment

A second illustrative embodiment relates to sequential lighting of sequentially turning on a plurality of light sources aligned from an inner side to an outer side in the width direction of the vehicle.

Like the first illustrative embodiment, when the lamp as one turn signal lamp is divided into the two lamp units, i.e., the light emitting units having the light sources are dispersedly arranged in two housings, the sequential lighting is performed from a light emitting unit (hereinafter, referred to as "first light emitting unit") arranged closely to an inner side in the width direction of the vehicle to a light emitting unit (hereinafter, referred to as "second light emitting unit") arranged closely to an outer side in the width direction of the vehicle. Specifically, after the light sources aligned in the first light emitting unit are sequentially turned on in a direction from the inner side towards the outer side in the width direction of the vehicle, the light sources in the second light emitting unit are turned on.

Figure 8:
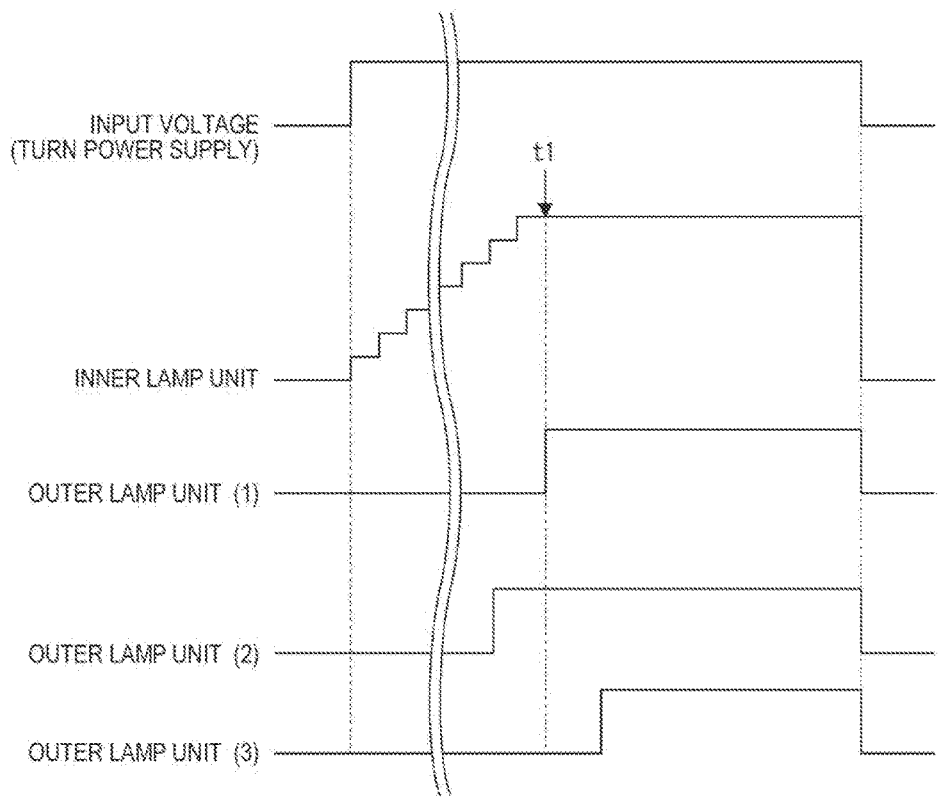
FIG. 8 depicts waveform diagrams of an input voltage (turn power supply) from a turn lamp ECU, a supply current value to an inner lamp unit and a supply current value to the outer lamp unit upon sequential lighting.

FIG. 8 depicts waveform diagrams of an input voltage (turn power supply) from the turn lamp ECU 100, a supply current value to an inner lamp unit and a supply current value to an outer lamp unit upon the sequential lighting. Meanwhile, in FIG. 8, it is presumed that after the inner lamp unit sequentially turns on a plurality of light sources, the outer lamp unit turns on a plurality of light sources at the same time.

As shown, when the input voltage becomes ON, the light sources of the inner lamp unit are first sequentially turned on, and the light sources of the outer lamp unit are turned on at predetermined time t1 after all the light sources of the inner lamp unit are turned on (refer to the waveform of "outer lamp unit 1" in FIG. 8).

Meanwhile, in this example, an on time period of the input voltage is set to about 350 ms, for example.

In order to implement the above sequential lighting, it is considered to provide the lighting circuit of the first light emitting unit with a timing generation circuit (timer circuit) for sequentially turning on the light sources at a predetermined time interval and to provide the lighting circuit of the second light emitting unit with a timing generation circuit for standing by for a time period until all the light sources of the first light emitting unit are turned on.

However, when each lighting circuit is provided with the timing generation circuit, a deviation may be caused with respect to connection of the sequential lighting from the first light emitting unit to the second light emitting unit due to variation in characteristics of each timing generation circuit (refer to the waveforms of "outer lamp unit 2" and "outer lamp unit 3" in FIG. 8).

The second illustrative embodiment is to prevent the deviation of the connection of the sequential lighting.

Figure 9:
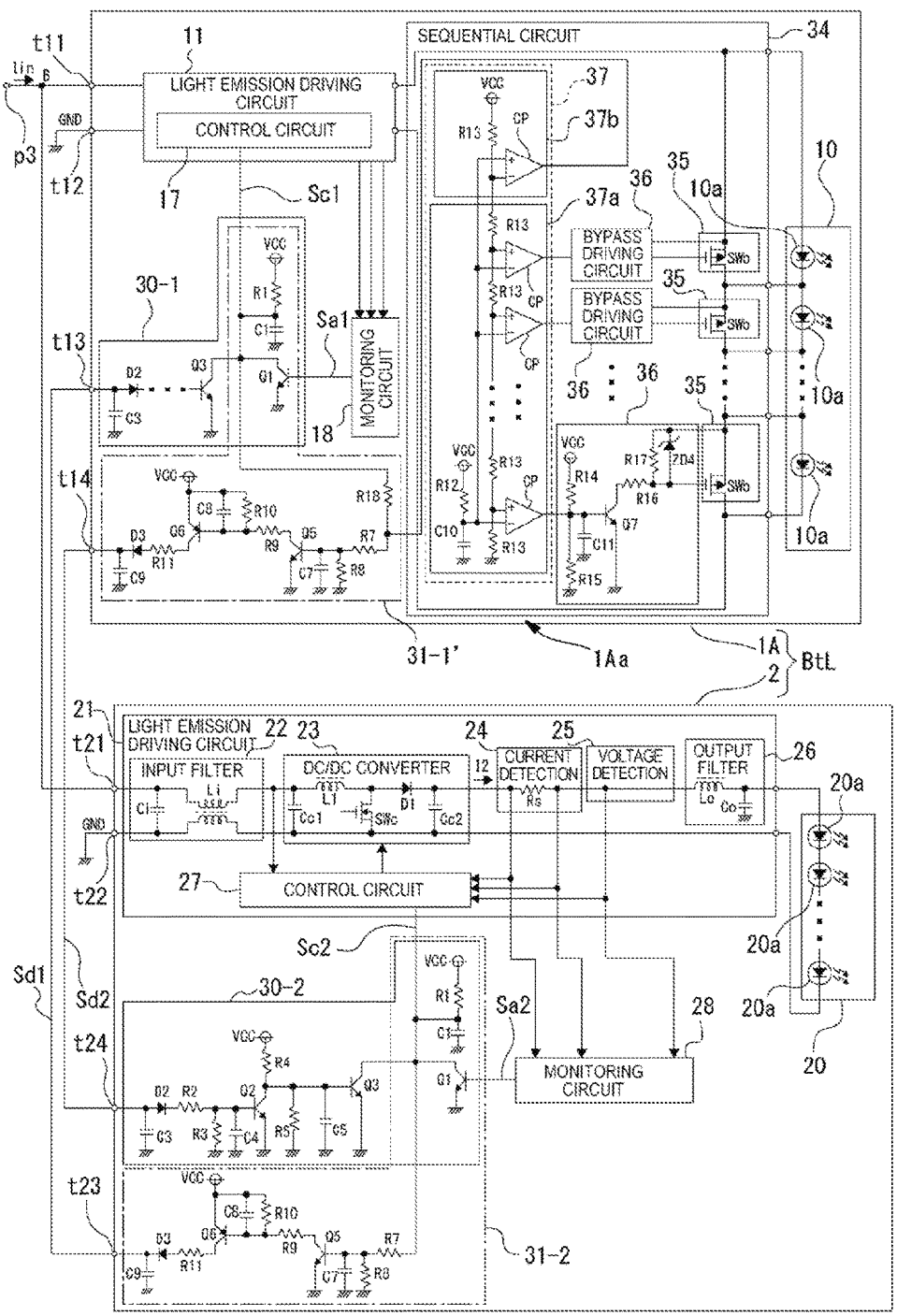
FIG. 9 is a circuit diagram depicting a circuit configuration in a turn signal lamp having a light source lighting circuit of a second illustrative embodiment.

FIG. 9 is a circuit diagram depicting a circuit configuration in the left and rear turn lamp BtL having a light source lighting circuit of the second illustrative embodiment. In the meantime, a circuit configuration in the right and rear turn lamp BtR is the same as the left and rear turn lamp BtL and the descriptions thereof are omitted.

The left and rear turn lamp BtL of the second illustrative embodiment is different from the left and rear turn lamp BtL shown in FIG. 6, in that an inner lamp unit 1A is provided, instead of the inner lamp unit 1.

In lighting circuit 1Aa of the inner lamp unit 1A, a sequential circuit 34 is added to the inner lamp unit 1 and a notification signal output circuit 31-1' is provided instead of the notification signal output circuit 31-1.

The sequential circuit 34 includes switch circuits 35 connected in parallel with each light emitting element 10a of the light emitting unit 10, bypass driving circuits 36 provided for the respective switch circuits 35 and a timing generation circuit 37. In the meantime, regarding internal configurations of the bypass driving circuits 36, only an internal configuration of the circuit located at the lowest side in FIG. 8 is representatively shown for convenience of illustration.

Each switch circuit 35 has a bypass switch SWb, which is a P-type MOSFET, for example, and a drain and a source of each bypass switch SWb are respectively connected to an anode and a cathode of one corresponding light emitting element 10a.

The timing generation circuit 37 includes a serial connection circuit configured by a resistance R12 and a capacitor C10 inserted between the power supply voltage VCC and the earth, comparators CP of which the number is one+the number of the light emitting elements 10a, and a serial connection circuit configured by resistances R13, which are inserted between the power supply voltage VCC and the earth and of which the number is one+the number of the comparators CP.

In the serial connection circuit configured by the resistances R13, each connection point of the resistances R13 except for the resistance R13 (hereinafter, conveniently referred to as "uppermost resistance R13") connected closest to the power supply voltage VCC is connected to a non-inversion terminal of one corresponding comparator CP.

The one remaining comparator CP (hereinafter, conveniently referred to as "uppermost comparator CP") having a non-inversion terminal to which the connection point of the resistances R13 is not connected has an inversion terminal to which a connection point of the uppermost resistance R13 and the following resistance R13 connected closely to the power supply voltage VCC is connected. The inversion terminal of each comparator CP except for the uppermost comparator CP is connected to a connection point of the resistance R12 and the capacitor C10. The non-inversion terminal of the uppermost comparator CP is connected to the connection point of the resistance R12 and the capacitor C10.

Meanwhile, in the timing generation circuit 37, a circuit part configured by each comparator CP except for the uppermost comparator CP, each resistance R13 except for the uppermost resistance R13, the resistance R12 and the capacitor C10 is hereinafter referred to as "inner sequential lighting timer unit 37a". Also, in the timing generation circuit 37, a circuit part configured by the uppermost comparator CP and the uppermost resistance R13 is hereinafter referred to as "notification timer unit 37b".

Each bypass driving circuit 36 has a resistance R14, a resistance R15, a capacitor C11, a transistor Q7, a resistance R16, a resistance R17, and a Zener diode ZD4.

In each bypass driving circuit 36, a serial connection circuit configured by the resistance R14 and the resistance R15 is inserted between the power supply voltage VCC and the earth, and the capacitor C11 is inserted between a connection point of the resistance R14 and the resistance R15 and the earth. The connection point of the resistance R14 and the resistance R15 and a connection point with the capacitor C11 are connected to a base of the transistor Q7, which is an NPN-type bipolar transistor, for example. An emitter of the transistor Q7 is earthed, and a collector thereof is connected to a drain of one corresponding bypass switch SWb via a serial connection circuit configured by the resistance R16 and the resistance R17.

A connection point of the resistance R16 and the resistance R17 is connected to a gate of one corresponding bypass switch SWb. Also, a cathode and an anode of the Zener diode ZD4 are respectively connected to the drain and the gate of one corresponding bypass switch SWb, so that the Zener diode is connected in parallel with the resistance R17 between the drain and the gate of the bypass switch SWb.

In each bypass driving circuit 36, the connection point of the resistance R14 and the resistance R15 is connected to an output terminal of one corresponding comparator CP.

The notification signal output circuit 31-1' is different from the notification signal output circuit 31-1 of FIG. 6, in that a resistance R18 is added between the collector of the transistor Q1 and the resistance R7.

In the notification signal output circuit 31-1', a connection point of the resistance R18 and the resistance R7 is connected to the output terminal of the comparator CP (the uppermost comparator CP) of the notification timer unit 37b.

The operations that are performed in accordance with the above configurations are described.

When the battery voltage B is supplied from the turn lamp ECU 100 via the port p3, the power supply voltage VCC becomes ON (because the power supply voltage VCC is a voltage input by branching the battery voltage B, as described above), so that the capacitor C10 is charged. Together this, the non-inversion terminal of each comparator CP in the inner sequential lighting timer unit 37a and the inversion terminal of each comparator CP in the notification timer unit 37b are input with a voltage of a value corresponding to the voltage value of the power supply voltage VCC and a voltage division ratio by the resistance R13. At this time, the input voltage value is greater for the comparator CP located at an upper side in FIG. 9.

For a time period after the supply of the battery voltage B from the turn lamp ECU 100 starts, as the capacitor C10 is charged, the input voltage values to the inversion terminal of each comparator CP in the inner sequential lighting timer unit 37a and the non-inversion terminal of the comparator CP in the notification timer unit 37b gradually increase. According to this, in the inner sequential lighting timer unit 37a, the input voltage value to the inversion terminal exceeds the input voltage value to the non-inversion terminal in order from the lowest comparator CP in FIG. 9 of which the input voltage value to the non-inversion terminal is lowest. That is, the output drops from an H level to an L level in order from the lowest comparator CP in FIG. 9.

Also, the input voltage value to the inversion terminal of the comparator CP in the notification timer unit 37b is highest. Therefore, after the output of the uppermost comparator CP in the inner sequential lighting timer unit 37a is inverted, the input voltage value to the non-inversion terminal exceeds the input voltage value to the inversion terminal, so that the output rises from an L level to an H level.

In the bypass driving circuit 36, for a time period in which the output of the corresponding comparator CP is not inverted yet (i.e. the output is an H level) after the supply of the battery voltage B from the turn lamp ECU 100 starts, the transistor Q7 becomes ON. When the transistor Q7 is ON, an ON voltage is applied to the gate of the corresponding bypass switch SWb (P-type MOSFET), so that the bypass switch SWb becomes ON. That is, the light emitting element 10a connected in parallel with the bypass switch SWb is not turned on.

For the time period after the supply of the battery voltage B from the turn lamp ECU 100 starts, when the outputs of the comparators CP of the inner sequential lighting timer unit 37a are sequentially inverted, as described above, the transistors Q7 become OFF in order from the bypass driving circuit 36 located at the lowest side in FIG. 9, so that the corresponding bypass switches SWb become sequentially OFF.

Thereby, in the light emitting unit 10, the lighting of the light emitting elements 10a is performed in order from the light emitting element 10a located at the lowest side in FIG. 9.

In the inner lamp unit 1A, the light emitting element 10a located at a lower side in FIG. 9 is positioned at an inner side in the width direction of the vehicle. That is, in this case, the sequential lighting is performed from an inner side towards an outer side in the width direction of the vehicle.

Subsequently, the operations of the notification timer unit 37b are described.

For a time period in which the output of the comparator CP of the notification timer unit 37b is kept at an L level after the supply of the battery voltage B from the turn lamp ECU 100 starts, the base current does not flow to the transistor Q5 of the notification signal output circuit 31-1', so that the transistor Q5 is at an OFF state and the transistor Q6 is also at an OFF state. That is, the notification signal Sd2 to the outer lamp unit 2 is an L level.

As described above, when the notification signal Sd2 is an L level, an operation corresponding to the disconnection state is executed in the outer lamp unit 2. Specifically, the operation stop control circuit 30-2 outputs the control signal Sc2 of an L level corresponding to an abnormal state to the control circuit 27, so that the DC/DC converter 23 stops the operation thereof. For this reason, each light emitting element 20a in the light emitting unit 20 is kept at a lights-out state.

On the other hand, after the supply of the battery voltage B starts, when all the outputs of the comparators CP in the inner sequential lighting timer unit 37a are inverted and the output of the comparator CP in the notification timer unit 37b rises to an H level, the transistor Q5 and the transistor Q6 in the notification signal output circuit 31-1' become ON and the notification signal Sd2 and the control signal Sc2 are switched to H levels corresponding to the normal state. For this reason, the operation stop control of the DC/DC converter 23 by the control circuit 27 is released, so that the lighting of the light emitting elements 20a starts.

Like this, in the second illustrative embodiment, the sequential lighting where the lighting of all the light emitting elements 20a of the outer lamp unit 2 starts after the light emitting elements 10a of the inner lamp unit 1A are sequentially turned on is implemented.

At this time, the sequential lighting of the light emitting elements 10a in the inner lamp unit 1A and the lighting of the light emitting elements 20a in the outer lamp unit 2 are performed in accordance with the timing signal that is to be output by the common timing generation circuit 37 provided for the inner lamp unit 1A. For this reason, it is possible to prevent the deviation of the connection of the sequential lighting between the inner lamp unit and the outer lamp unit as shown in FIG. 8.

Herein, the disconnection determination for the left and rear turn lamp BtL (and the right and rear turn lamp BtR) of the second illustrative embodiment configured to perform the sequential lighting as described above is performed by the turn lamp ECU 100 for a time period after the light emitting elements 20a in the light emitting unit 20 are turned on until the supply of the battery voltage B is OFF.

In the above, the sequential lighting of the light sources is performed only at the lamp unit-side arranged at the inner side. However, the sequential lighting of the light sources may be performed at the lamp unit-side arranged at the outer side, too.

Figure 10:
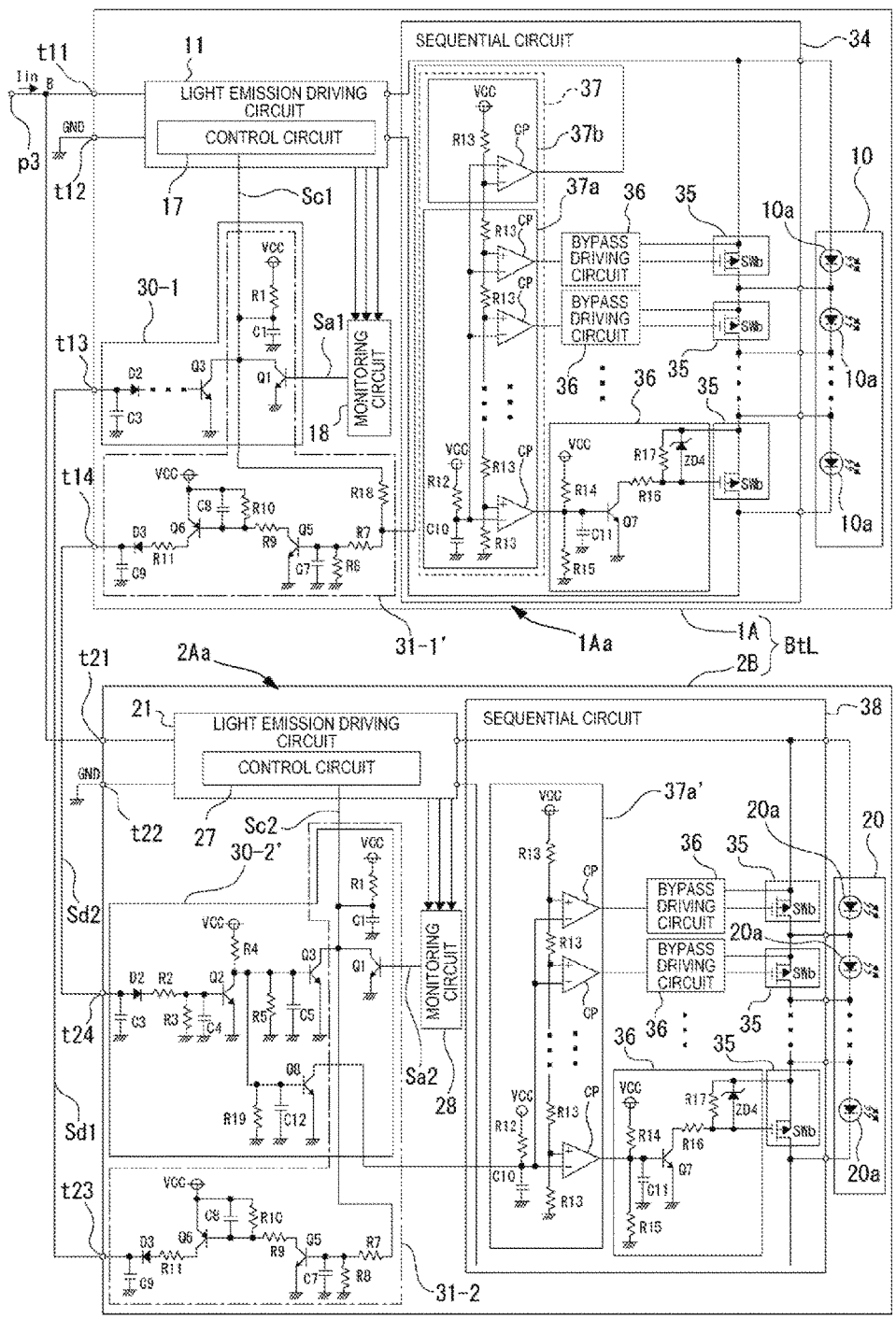
FIG. 10 is a circuit diagram for illustrating a modified embodiment of the second illustrative embodiment.

FIG. 10 is a circuit diagram depicting a circuit configuration in the left and rear turn lamp BtL in accordance with a modified embodiment where the sequential lighting of the light sources is performed in both the inner and outer lamp units.

The left and rear turn lamp BtL of the modified embodiment is different from FIG. 9, in that an outer lamp unit 2B is provided instead of the outer lamp unit 2. The lighting circuit 2Ba of the outer lamp unit 2B is different from the outer lamp unit 2, in that a sequential circuit 38 is added and an operation stop control circuit 30-2' is provided instead of the operation stop control circuit 30-2.

The sequential circuit 38 is different from the sequential circuit 34 of FIG. 9, in that an outer sequential lighting timer unit 37a' is provided instead of the timing generation circuit 37. The outer sequential lighting timer unit 37a' is different from the timing generation circuit 37 of FIG. 9, in that the comparator CP and the resistance R13 in the notification timer unit 37b are omitted.

The operation stop control circuit 30-2' is different from the operation stop control circuit 30-2, in that a resistance R19, a capacitor C12 and a transistor Q8 are added. The transistor Q8 is an NPN-type bipolar transistor, for example, and a base thereof is connected to the collector of the transistor Q2. A parallel connection circuit configured by the resistance R19 and the capacitor C12 is inserted between the base of the transistor Q8 and the earth.

An emitter of the transistor Q8 is earthed, and a collector thereof is connected to a connection point of the resistance R12 and the capacitor C10 in the outer sequential lighting timer unit 37a'.

Also in the above configuration, for a time period in which the output of the comparator CP of the notification timer unit 37b is kept at an L level after the supply of the battery voltage B starts, the notification signal Sd2 is an L level corresponding to an abnormal state. For this reason, the control signal Sc2 is also an L level and the operation of the DC/DC converter 23 is stopped by the control circuit 27. That is, each light emitting element 20a of the light emitting unit 20 is at the lights-out state.

At this time, when the notification signal Sd2 is an L level, since the transistor Q2 in the operation stop control circuit 30-2' becomes OFF, the transistor Q8 becomes ON. When the transistor Q8 is ON, the charging of the capacitor C10 based on the power supply voltage VCC is not performed in the outer sequential lighting timer unit 37a', and the input voltage value of the non-inversion terminal of each comparator CP is higher than the input voltage value of the inversion terminal and the output of each comparator is an H level.

On the other hand, after the supply of the battery voltage B starts, when all the outputs of the comparators CP of the inner sequential lighting timer unit 37a are inverted and then the output of the comparator CP of the notification timer unit 37b rises to an H level and the notification signal Sd2 becomes an H level, the transistor Q8 becomes OFF, the charging of the capacitor C10 starts in the outer sequential lighting timer unit 37a' and the outputs are inverted from an H level to an L level in order from the comparator CP of which the input voltage value to the non-inversion terminal is lower (in order from the comparator CP located at the lower side in FIG. 10).

As a result, the lighting is sequentially performed in order from the light emitting element 20a, which is located on the lower side in FIG. 10, in the light emitting unit 20. That is, after the sequential lighting of the light emitting elements 10a in the inner lamp unit 1A is completed, the sequential lighting is performed from the innermost light emitting element 20a towards the outermost light emitting element 20a of the outer lamp unit 2B in the width direction of the vehicle.

In the above, the example where the light sources are turned on one by one has been described as the sequential lighting. However, in the sequential lighting, the number of the light sources, which are to be turned on at the same timing, is not limited to one.

Also, the configuration of the timing generation circuit 34 is not limited to the above exemplified configuration. That is, any configuration is possible inasmuch as it can generate the timing signal at a predetermined time interval.

Also in the second illustrative embodiment, the current consuming unit 32 and the current regulation circuit 33 may be provided for any one of the inner and outer lamp units. In this case, when provided for the inner lamp unit, the gate of the switch SWd in the current regulation circuit 33 may be connected to the output line of the control signal Sc1, and when provided for the outer lamp unit, the gate may be connected to the output line of the control signal Sc2.

As described above, the light source lighting circuit of the second illustrative embodiment is a light source lighting circuit including a first lighting circuit (a part including at least the light emission driving circuit 11 except for the light emitting unit 10 of the circuit in the inner lamp unit 1A) configured to turn on a plurality of light sources of a first light emitting unit (the light emitting unit 10) on the basis of an input voltage and a second lighting circuit (a part including at least the light emission driving circuit 21 except for the light emitting unit 20 of the circuit in the outer lamp unit 2 or 2B) configured to turn on a light source of a second light emitting unit (the light emitting unit 20) on the basis of an input voltage.

The first lighting circuit includes a timing generation circuit (34) configured to perform timing generation, a first lighting timing control circuit (the bypass driving circuit 36 and the switch circuit 35) configured to sequentially turn on the light sources of the first light emitting unit in accordance with a timing signal to be output from the timing generation circuit, and a timing signal output circuit (the notification signal output circuit 31-1') configured to output the timing signal, which is to be output from the timing generation circuit, to the second lighting circuit. The second lighting circuit includes a second lighting timing control circuit (the operation stop control circuit 30-2, or the operation stop control circuit 30-2', the outer sequential lighting timer unit 37a', the bypass driving circuit 36 and the switch circuit 35) configured to turn on the light source in the second light emitting unit in accordance with the timing signal to be output from the timing signal output circuit.

Therefore, the first lighting circuit is configured to sequentially turn on the light sources of the first light emitting unit in accordance with the timing signal and to output the timing signal to the second lighting circuit. The second lighting circuit is configured to turn on the light source of the second light emitting unit in accordance with the timing signal.

With the above configuration, the sequential lighting in the first light emitting unit and the lighting in the second light emitting unit are controlled in accordance with the common timing signal, i.e., the timing signal from the common timing generation circuit provided for the first lighting circuit-side, in the second illustrative embodiment.

Therefore, it is possible to prevent the deviation of the connection of the sequential lighting from the first light emitting unit to the second light emitting unit.

Also, in the light source lighting circuit of the second illustrative embodiment, the second light emitting unit includes a plurality of light sources, and the second lighting circuit is configured to sequentially turn on the light sources in the second light emitting unit in accordance with the timing signal.

With this configuration, the sequential lighting of the light sources in the second light emitting unit starts at appropriate timing, following the sequential lighting of the light sources in the first light emitting unit.

Therefore, it is possible to appropriately perform the sequential lighting where the sequential lighting of the light sources is to be performed in both the first light emitting unit and the second light emitting unit.

In the light source lighting circuit of the second illustrative embodiment, the first lighting circuit and the second lighting circuit are configured to receive current from a common electric power supply line and to turn on the corresponding light sources corresponding, the light source lighting circuit includes a monitoring circuit (18) provided for the first lighting circuit and configured to monitor drive current flowing to the light sources of the first light emitting unit and to generate a state signal (Sa1), a notification signal output circuit (31-1') provided for the first lighting circuit and configured to output a notification signal (Sd2) corresponding to the state signal to the second lighting circuit, and a control unit (the operation stop control circuit 30-2, 30-2', the current regulation circuit 33) that is provided for the second lighting circuit and stops the operation of the second lighting circuit or lowers a current value of regulating current (Id) flowing to a current consuming unit (32) configured to consume a part of the electric power to be supplied from the electric power supply line when the notification signal indicates an abnormality, and the timing signal output circuit is configured to output the timing signal through an output line of the notification signal.

That is, the first lighting circuit is configured to generate the state signal corresponding to the drive current flowing to the light sources of the first light emitting unit and to output the notification signal corresponding to the state signal to the second lighting circuit. The second lighting circuit stops operation thereof or lowers the current value of the regulating current flowing to the current consuming unit configured to consume a part of the electric power to be supplied from the electric power supply line when the notification signal indicates an abnormality. The first lighting circuit is configured to output the timing signal through the output line of the notification signal.

With this configuration, it is not necessary to provide a separate output line of the timing signal in the configuration of stopping the operation of the second lighting circuit or lowering the current value of the regulating current, in correspondence to occurrence of the disconnection in the first light emitting unit.

Therefore, it is possible to reduce the number of terminals and to simplify the circuit configuration, so that it is possible to save the cost.

Further, in the light source lighting circuit of the second illustrative embodiment, the first lighting circuit includes a first DC/DC converter having a first switching element and the second lighting circuit includes a second DC/DC converter having a second switching element.

The DC/DC converter has a relatively less amount of heat generation.

Therefore, it is possible to simplify the configuration for countermeasures against heat, so that it is possible to suppress an increase in cost.

Also, the turn signal lamp of the second illustrative embodiment includes a first lamp unit attached to a door part provided to be freely openable and closable for a vehicle main body part at a rear end portion of a vehicle, and a second lamp unit attached to the vehicle main body part-side and positioned at an outermore side than the first lamp unit in a width direction of the vehicle. The first lamp unit includes the first lighting circuit and the first light emitting unit of the light source lighting circuit of the second illustrative embodiment, and the second lamp unit includes the second lighting circuit and the second light emitting unit of the light source lighting circuit of the second illustrative embodiment.

With this configuration, it is possible to prevent the lighting operation from being destabilized in the turn signal lamp where the respective lamp units are dispersedly arranged at the vehicle main body part and the door part.

Herein, in order to prevent the deviation of the connection of the sequential lighting, a configuration where a part of the respective sets of the switch circuit 35 and the light emitting element 10a in the inner lamp unit 1A of FIG. 9 is arranged at the outer lamp unit is considered, for example. Specifically, the positive electrode-side line of the output voltage from the light emission driving circuit 11 and a part of the light emitting elements 10a connected to the positive electrode-side line and the switch circuit 35 corresponding to the light emitting element are arranged in the outer lamp unit.

In this case, the electric power supply line is wired from the inner lamp unit to the outer lamp unit. When the inner lamp unit is attached to a door part such as a rear gate and the outer lamp unit is attached to the vehicle main body part, a length of the wiring for coupling both the lamp units is relatively lengthened (for example, about 5 m). Therefore, in the above configuration, an influence of a noise on the electric power supply line increases, so that the lighting operation may be destabilized.

In contrast, according to the turn signal lamp of the second illustrative embodiment, since it is a signal line for transmitting the timing signal that wires between the respective lamp units so as to prevent the deviation of the connection of the sequential lighting, it is possible to avoid the destabilization of the lighting operation, which is to be caused when wiring the electric power supply line.

In the meantime, the present invention is not limited to the above specific examples and a variety of modified embodiments can be made.

For example, in the above, the turn signal lamp includes the two lamp units but may include three or more lamp units.

Also, the light source lighting circuit of the present invention can be favorably applied to the other vehicle lamps, in addition to the turn signal lamp.

Third Illustrative Embodiment

In the below, a turn signal lamp having a light source lighting circuit of a third illustrative embodiment is described with reference to the accompanying drawings.

In the third illustrative embodiment, in order to appropriately perform the disconnection determination even when the lower limit value Ld and the upper limit value Lu come close to each other or lap each other, as described above with reference to FIG. 4, at least one of the inner lamp unit 1 and the outer lamp unit 2 is provided with a current consuming unit configured to consume a part of the electric power to be supplied from the corresponding port p of the turn lamp ECU 100 and to enable regulating current to flow, and the regulating current is stopped when the disconnection is detected in at least one of the inner lamp unit 1 and the outer lamp unit 2.

Figure 11:
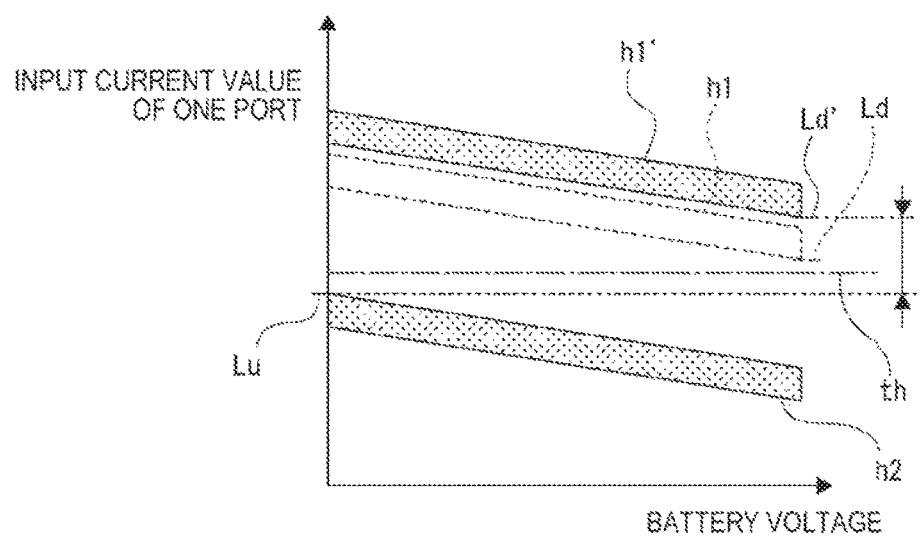
FIG. 11 illustrates an action that is to be obtained when adopting a method of using regulating current.

FIG. 11 illustrates an action that is to be obtained when adopting the way of using the regulating current.

According to the above way, the regulating current flows in the normal state where the disconnection does not occur. Thereby, as shown with a change characteristic h1' in FIG. 11, the change characteristic of the supply current value from the port p in the normal state is raised by a magnitude corresponding to the current value of the regulating current with respect to the previous change characteristic h1. As a result, since the lower limit value Ld increases by the magnitude corresponding to the current value of the regulating current (the lower limit value Ld' in FIG. 11), it is possible to secure a difference of the margin M or greater between the lower limit value Ld' and the upper limit value Lu, so that it is possible to appropriately perform the disconnection determination by the turn lamp ECU 100.

In the below, a specific circuit configuration for implementing the above way is described with reference to a circuit diagram of FIG. 12.

Figure 12:
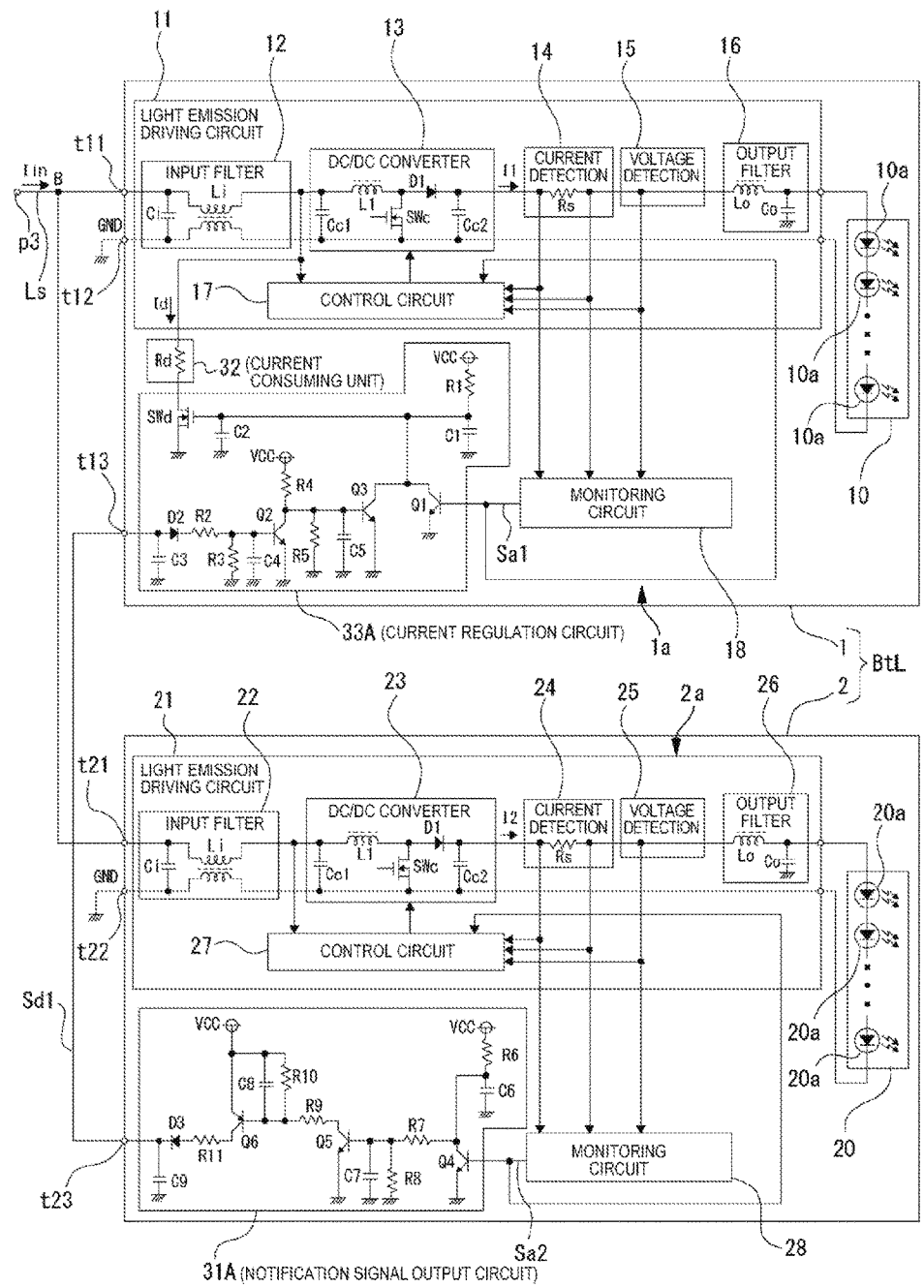
FIG. 12 is a circuit diagram depicting a circuit configuration in a turn signal lamp having a light source lighting circuit of a third illustrative embodiment.

In the meantime, FIG. 12 depicts an internal circuit configuration of the left and rear turn lamp BtL. However, since an internal circuit configuration of the right and rear turn lamp BtR is the same as that of FIG. 12, the overlapping descriptions are omitted.

Also, in the below, the electric power supply line from the port p3 is referred to as "electric power supply line Ls".

In FIG. 12, the inner lamp unit 1 includes a light emitting unit 10 having light emitting elements 10a as light sources, a light emission driving circuit 11 configured to enable the light emitting elements 10a of the light emitting unit 10 to emit lights on the basis of the battery voltage B to be input from the port p3 (to be supplied from the electric power supply line Ls), a monitoring circuit 18 configured to monitor drive current I1 flowing to the light emitting elements 10a and to generate a state signal Sa1, a current consuming unit 32 and a current regulation circuit 33A.

Also, the inner lamp unit 1 is provided with a positive electrode-side input terminal t11 connected to a positive electrode-side of the battery voltage B, a GND terminal t12 grounded to the earth, and a notification signal input terminal t13, which is a terminal for inputting a notification signal Sd1 (which will be described later) to be output through a notification signal output terminal t23 from the outer lamp unit 2. The notification signal input terminal t13 is connected to a notification signal output terminal t23 via harness.

The light emission driving circuit 11 has an input filter 12, a DC/DC converter 13, a current detection circuit 14, a voltage detection circuit 15, an output filter 16 and a control circuit 17, like the first illustrative embodiment described with reference to FIG. 6. The overlapping descriptions of the input filter 12, the DC/DC converter 13, the current detection circuit 14, the voltage detection circuit 15 and the output filter 16 are omitted.

The control circuit 17 is configured to perform constant current control on the drive current I1, like the first illustrative embodiment described with reference to FIG. 6.

Also, when the state signal Sa1 input from the monitoring circuit 18 indicates an abnormality, the control circuit 17 stops the operation of the DC/DC converter 13 by keeping the switching element SWc at an OFF state. Thereby, after an abnormality such as disconnection is detected, the light emitting unit 10 is forcibly kept at the lights-out state (even when the electric power is supplied from the port p3).

The monitoring circuit 18 is configured to detect the current value of the drive current I1 and a voltage value of the output voltage of the DC/DC converter 13 on the basis of an input from the current detection circuit 14 and an input from the voltage detection circuit 15, and to generate a state signal Sa1 indicative of a state of the drive current I1 on the basis of the detection results. When disconnection has occurred in the light emitting unit 10, the current value of the drive current I1 becomes zero (0). Also, when a shortcut has occurred in the light emitting unit 10, the output voltage of the DC/DC converter 13 becomes zero (0). The monitoring circuit 18 is configured to detect, as an abnormality, a state where the current value of the drive current I1 is zero or the output voltage of the DC/DC converter 13 is zero, and raises the state signal Sa1 to an H level when an abnormality is detected.

The current consuming unit 32 is provided as a pseudo-load for the light emission driving circuit 11 and is configured to enable the regulating current Id (pseudo-load current: dummy current) to flow to the light emission driving circuit 11. In the third illustrative embodiment, the current consuming unit 32 is configured to consume the electric power by a dummy resistance Rd. That is, the resistance element is used to generate the regulating current Id. The dummy resistance Rd has one end connected to the connection point of the other end of the first coil of the input filter 12 and one end of the coil L1 of the DC/DC converter 13. For this reason, it is possible to enable the regulating current Id to flow to the light emission driving circuit 11, in correspondence to the electric power supply from the port p3.

The current regulation circuit 33A stops the regulating current Id when the state signal Sa1 from the monitoring circuit 18 indicates an abnormality or when the notification signal Sd1 from the outer lamp unit 2 indicates an abnormality. To this end, the current regulation circuit 33A is provided with a transistor Q1, a resistance R1, a capacitor C1, a switch SWd, a capacitor C2, a capacitor C3, a diode D2, a resistance R2, a resistance R3, a capacitor C4, a transistor Q2, a resistance R4, a resistance R5, a capacitor C5 and a transistor Q3.

The transistor Q1 is an NPN-type bipolar transistor, for example, and a base thereof is connected to a supply line of an abnormality detection signal Sa from the monitoring circuit 18. A collector of the transistor Q1 is connected to a connection point of the resistance R1 and the capacitor C1 and an emitter thereof is grounded. The resistance R1 and the capacitor C1 are inserted in series between the power supply voltage VCC and the earth, the resistance R1 is connected to the power supply voltage VCC and the capacitor C1 is grounded, as shown.

The switch SWd is an N-type MOSFET, for example, and a drain thereof is connected to the other end of the dummy resistance Rd and a source thereof is grounded.

The capacitor C2 is inserted between a gate of the switch SWd and the earth, and a connection point of the capacitor C2 and the gate of the switch SWd is connected to the connection point of the resistance R1 and the capacitor C1 and a connection point with the collector of the transistor Q1.

The capacitor C3 is inserted between the notification signal input terminal t13 and the earth, and an anode of the diode D2 is connected to a connection point of the notification signal input terminal t13 and the capacitor C3. A cathode of the diode D2 is connected to one end of the resistance R2, and the other end of the resistance R2 is connected to a base of the transistor Q2, which is an NPN-type bipolar transistor, for example. Also, a parallel connection circuit configured by the resistance R3 and the capacitor C4 is inserted between the other end of the resistance R2 and the earth.

A collector of the transistor Q2 is connected to the power supply voltage VCC via the resistance R4, and an emitter thereof is grounded. A base of the transistor Q3, which is an NPN-type bipolar transistor, for example, is connected to a connection point of the collector of the transistor Q2 and the resistance R4. Also, a parallel connection circuit configured by the resistance R5 and the capacitor C5 is inserted between the connection point of the collector of the transistor Q2 and the resistance R4 and the earth.

A collector of the transistor Q3 is connected to the connection point of the resistance R1 and the capacitor C1 and the connection point with the collector of the transistor Q1, and an emitter thereof is grounded.

Subsequently, a circuit configuration of the outer lamp unit 2 is described.

The outer lamp unit 2 includes a light emitting unit 20 having light emitting elements 20a as light sources, a light emission driving circuit 21 configured to enable the light emitting elements 20a of the light emitting unit 20 to emit lights on the basis of the battery voltage B to be input from the port p3 (to be supplied from the electric power supply line Ls), a monitoring circuit 28 configured to monitor drive current I2 flowing to the light emitting elements 20a and to generate a state signal Sa2, and a notification signal output circuit 31A configured to output the notification signal Sd1 corresponding to the state signal Sa2 to the inner lamp unit 1.

Also, the outer lamp unit 2 is provided with a positive electrode-side input terminal t21 connected to the positive electrode-side of the battery voltage B, a GND terminal t22 grounded to the earth, and a notification signal output terminal t23, which is a terminal for outputting the notification signal Sd1 of the notification signal output circuit 31A to the inner lamp unit 1.

The light emission driving circuit 21 has an input filter 22, a DC/DC converter 23, a current detection circuit 24, a voltage detection circuit 25, an output filter 26 and a control circuit 27. Also, the light emitting unit 20 has a serial connection circuit in which the plurality of light emitting elements 20a is connected in series, and LEDs are used as the light emitting elements 20a.

In the meantime, since the configurations and connections of the input filter 22, the DC/DC converter 23, the current detection circuit 24, the voltage detection circuit 25, the output filter 26, the control circuit 27, the light emitting unit 20 and the monitoring circuit 28 are the same as those of the input filter 12, the DC/DC converter 13, the current detection circuit 14, the voltage detection circuit 15, the output filter 16, the control circuit 17, the light emitting unit 10 and the monitoring circuit 18 of the inner lamp unit 1, the overlapping descriptions thereof are omitted.

In the third illustrative embodiment, the number of the light emitting elements 20a in the light emitting unit 20 is eight, for example, like the light emitting unit 10.

The notification signal output circuit 31A has a transistor Q4, a resistance R6, a capacitor C6, a resistance R7, a resistance R8, a capacitor C7, a transistor Q5, a resistance R9, a resistance R10, a capacitor C8, a transistor Q6, a resistance R11, a diode D3 and a capacitor C9.

The transistor Q4 is an NPN-type bipolar transistor, for example, and a base thereof is connected to a supply line of an abnormality detection signal Sa2 from the monitoring circuit 28, a collector thereof is connected to a connection point of the resistance R6 and the capacitor C6 and an emitter thereof is earthed. The resistance R6 and the capacitor C6 are inserted in series between the power supply voltage VCC and the earth, the resistance R6 is connected to the power supply voltage VCC and the capacitor C6 is grounded.

The connection point of the resistance R6 and the capacitor C6 and a connection point with the collector of the transistor Q4 are connected to a base of the transistor Q5, which is an NPN-type bipolar transistor, for example, via the resistance R7. Also, a parallel connection circuit configured by the resistance R8 and the capacitor C7 is inserted between a connection point of the base of the transistor Q5 and the resistance R7 and the earth.

A collector of the transistor Q5 is connected to the power supply voltage VCC via the resistance R9 and the resistance R10 and an emitter thereof is earthed. A connection point of the resistance R9 and the resistance R10 is connected to a base of the transistor Q6, which is PNP-type bipolar transistor, for example, and an emitter of the transistor Q6 is connected to the power supply voltage VCC. Also, the capacitor C8 is inserted between the base and the emitter of the transistor Q6.

A collector of the transistor Q6 is connected to an anode of the diode D3 via the resistance R11, and a cathode of the diode D3 is connected to the notification signal output terminal t23. The capacitor C9 is inserted between a connection point of the cathode of the diode D3 and the notification signal output terminal t23 and the earth.

The operations of the current regulation circuit 33A and the notification signal output circuit 31A having the above configuration are described.

First, the operations of the notification signal output circuit 31A are described. In the outer lamp unit 2, when the disconnection has not occurred in the light emitting unit 20 and the state signal Sa2 of the monitoring circuit 28 does not indicate an abnormality (L level), the transistor Q4 becomes OFF, so that the base current based on the power supply voltage VCC flows to the transistor Q5 and the transistor Q5 becomes ON. When the transistor Q5 becomes ON, the base current based on the power supply voltage VCC flows to the PNP-type transistor Q6, so that the transistor Q6 becomes ON, too. When the transistor Q6 becomes ON, the current flows to the notification signal input terminal t13 of the inner lamp unit 1 via the notification signal output terminal t23. That is, when the disconnection is not detected, the notification signal Sd1 becomes an H level.

On the other hand, when the state signal Sa2 of the monitoring circuit 28 indicates an abnormality (an H level) as the disconnection occurs, the transistor Q4 becomes ON, so that the transistor Q5 becomes OFF and the transistor Q6 becomes OFF, too. Thereby, when the disconnection (an abnormality) is detected, the current does not flow to the notification signal input terminal t13 and the notification signal Sd1 to the notification signal input terminal t13 becomes an L level.

Continuously, in the current regulation circuit 33A, when the state signal Sa1 of the monitoring circuit 18 does not indicate an abnormality (L level), the transistor Q1 becomes OFF.

Also, when the notification signal Sd1 from the outer lamp unit 2 towards the notification signal input terminal t13 does not indicate an abnormality, since the current flows to the notification signal input terminal t13, the transistor Q2 becomes ON, so that the base current based on the power supply voltage VCC does not flow to the transistor Q3 and the transistor Q3 becomes OFF.

Like this, in the normal state where an abnormality is not detected by the monitoring circuit 18 and the notification signal Sd1 from the outer lamp unit 2 does not indicate an abnormality, both the transistor Q1 and the transistor Q3 become OFF. Both the transistor Q1 and the transistor Q3 become OFF, so that a gate voltage based on the power supply voltage VCC is applied to the gate of the switch SWd connected to the dummy resistance Rd and the switch SWd becomes ON. That is, in the normal state, the regulating current Id flows to the light emission driving circuit 11 of the inner lamp unit 1.

On the other hand, when the state signal Sa1 of the monitoring circuit 18 indicates an abnormality as the disconnection occurs in the light emitting unit 10, the transistor Q1 becomes ON, so that the gate voltage based on the power supply voltage VCC is not applied to the switch SWd and the switch SWd becomes OFF. As a result, the regulating current Id is stopped.

Also, when the control signal Sd1 to the notification signal input terminal t13 becomes an L level indicative of an abnormality as the disconnection occurs in the light emitting unit 20, the transistor Q2 becomes OFF and the transistor Q3 becomes ON. The transistor Q3 becomes ON, so that the gate voltage based on the power supply voltage VCC is not applied to the switch SWd and the switch SWd becomes OFF. As a result, the regulating current Id is stopped.

With the above configuration, in the normal state where the disconnection does not occur in both the inner lamp unit 1 and the outer lamp unit 2, the regulating current Id is added, so that the supply current value (the current value of the electric power supply line Ls: the current value of the current Iin in FIG. 12) from the port p3 is raised by a magnitude corresponding to the current value of the regulating current Id. On the other hand, when the disconnection occurs in at least one of the inner lamp unit 1 and the outer lamp unit 2, the regulating current Id is stopped and the supply current value from the port p3 is lowered by a magnitude corresponding to "an amount of decrease in the current value due to the disconnection"+"an amount of decrease in the current value due to the stop of the regulating current Id", as compared to the normal state. Thereby, it is possible to increase the difference between the supply current values from the port p3 in the normal state and in the disconnection state of one lamp unit.

As a specific example, the consumption current values of the inner lamp unit 1 and the outer lamp unit 2 except for the dummy current Id in the left and rear turn lamp BtL are assumed to be the same within a range of 1.3 A to 0.3 A. In this example, if the current consuming unit 32 and the current regulation circuit 33A are not provided, the upper limit value of the change characteristic h1 is 1.3 A×2=2.6 A and the lower limit value Ld thereof is 0.3 A×2=0.6 A in the normal state shown in FIG. 4. The upper limit value Lu of the change characteristic h2 is 1.3 A and the lower limit value is 0.3 A in the disconnection state of one lamp unit. In this case, therefore, the upper limit value Lu in the disconnection state laps with the lower limit value Ld in the normal state.

In contrast, in the configuration shown in FIG. 12, it is assumed that the current value of the regulating current Id is set to 1.4 A. According to this configuration, the upper limit value of the change characteristic h1' is 1.3 A×2+1.4 A=4.0 A and the lower limit value Ld' is 0.3 A×2+1.4 A=2.0 A in the normal state shown in FIG. 11. In the disconnection state of one lamp unit, since the regulating current Id is stopped, the upper limit value Lu of the change characteristic h2 is 1.3 A and the lower limit value is 0.3 A, i.e., the limit values are not changed. As a result, the difference between the supply current values from the port p3 in the normal state and in the disconnection state of one lamp unit is 2.0 A−1.3 A=0.7 A, so that it is possible to secure a difference of the margin M 0.5 A (±0.25 A) or greater, which is necessary to perform the determination by using the threshold value th.

In the meantime, when the resistance element is used to generate the regulating current Id, like the example of FIG. 12, the current value of the regulating current Id fluctuates depending on the fluctuation of the battery voltage B. However, since the change characteristics of the current value of the regulating current Id and the supply current value from the port p3 resulting from the fluctuation of the battery voltage B are opposite to each other, it is easy to increase the supply current value difference in the normal state and in the disconnection state of one lamp unit. Specifically, while the supply current value from the port p3 decreases as the battery voltage B increases, the current value of the regulating current Id increases as the battery voltage B increases. Therefore, it is possible to improve the effect of raising the lower limit value Ld'.

In the meantime, the current value of the regulating current of the related art is set as a value of "a consumption current value of an incandescent lamp"−"a consumption current value of an LED". In contrast, the current value of the regulating current Id of the third illustrative embodiment is set as a value satisfying at least a condition "the lower limit value Ld of the supply current value from the port p3 in the normal state"−"the upper limit value Lu of the supply current value from the port p3 in the disconnection state of one lamp unit">"the margin M necessary for the determination"

Herein, as described above, the control circuit 17 of the inner lamp unit 1 performs the control of stopping the light emission driving operation of the light emission driving circuit 11 when the state signal Sa1 from the monitoring circuit 18 indicates an abnormality. The control circuit 27 of the outer lamp unit 2 also performs the control of stopping the light emission driving operation of the light emission driving circuit 21 when the state signal Sa2 from the monitoring circuit 28 indicates an abnormality.

Thereby, in the left and rear turn lamp BtL (and the right and rear turn lamp BtR), when the disconnection occurs in the lamp unit, the light emitting unit of the lamp unit in which the disconnection occurred is forcibly kept at the lights-out state.

According to the configurations of the light emitting units 10, 20, when the disconnection occurs in any one of the light emitting elements 10a, 20a, the other light emitting elements 10a, 20a are all enabled not to emit the lights. However, for example, when a plurality of serial connection circuits of the light emitting elements 10a, 20a is provided in parallel, even though the disconnection occurs in some light emitting elements 10a, 20a, the other light emitting elements 10a, 20a may emit the lights (blink). That is, in this case, the turn lamp blinks in a state where the light emitting elements 10a, 20a, which should emit the lights, do not emit the lights. That is, a turn lamp blinking is performed in a state where an appearance is poor.

However, as described above, since the light emitting unit of the lamp unit in which the disconnection occurred is forcibly kept at the lights-out state, it is possible to prevent the turn lamp from blinking in a state where an appearance is poor.

Also, the control circuit 17 of the inner lamp unit 1 does not perform the forcible stop of the light emission driving circuit 11 associated with the occurrence of an abnormality even when the notification signal Sd1 from the outer lamp unit 2 indicates an abnormality. In other words, when an abnormality is not detected by the monitoring circuit 18, the control circuit 17 keeps the light emission driving circuit 11 at the state where the light emitting elements 10a can emit the lights, even though the notification signal Sd1 from the outer lamp unit 2 indicates an abnormality. Thereby, even when the disconnection occurs in one lamp unit, the light emission driving circuit of the lamp unit in which the disconnection does not occur keeps the light source at the light emission drivable state.

Herein, in the configuration of FIG. 12, the current consuming unit 32 and the current regulation circuit 33A may be provided for the outer lamp unit 2, not the inner lamp unit 1.

Figure 13:
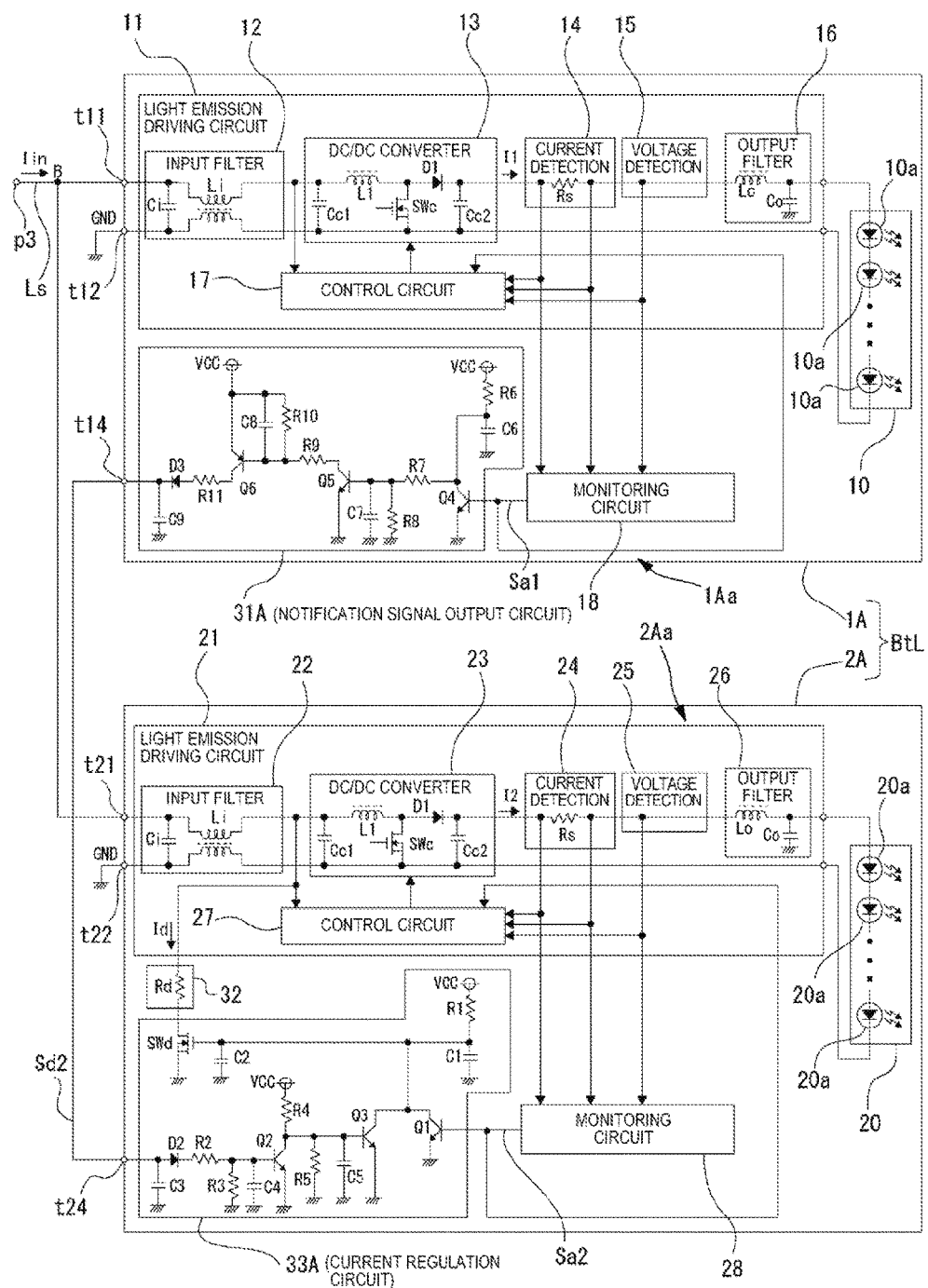
FIG. 13 is a circuit diagram depicting a circuit configuration in a turn signal lamp having a light source lighting circuit of a first modified embodiment of the third illustrative embodiment.

FIG. 13 is a circuit diagram depicting an internal circuit configuration of the left and rear turn lamp BtL in accordance with a first modified embodiment. Meanwhile, in the below, the same parts as the above descriptions are denoted with the same reference numerals and the descriptions thereof are omitted. Also in the below modified embodiment, since the internal circuit configuration of the right and rear turn lamp BtR is the same as the left and rear turn lamp BtL, the overlapping descriptions thereof are omitted.

The left and rear turn lamp BtL of the modified embodiment is provided with an inner lamp unit 1A where the current consuming unit 32 and the current regulation circuit 33A are omitted and the notification signal output circuit 31A and an outer lamp unit 2A where the notification signal output circuit 31A is omitted and the current consuming unit 32 and the current regulation circuit 33A.

In the inner lamp unit 1A, the supply line of the state signal Sa1 of the monitoring circuit 18 is connected to the base of the transistor Q4 of the notification signal output circuit 31A. Also, the notification signal input terminal t13 is omitted and the notification signal output terminal t14 is provided. The notification signal output terminal t14 is connected to the connection point of the cathode of the diode D3 and the capacitor C9 in the notification signal output circuit 31A. In the meantime, the notification signal that is to be output from the notification signal output terminal t14 is denoted as "notification signal 5*d*2".

In the outer lamp unit 2A, the supply line of the state signal Sa2 of the monitoring circuit 28 is connected to the base of the transistor Q1 of the current regulation circuit 33A. Also, the notification signal output terminal t23 is omitted, and the notification signal input terminal t24 connected to the connection point of the anode of the diode D2 and the capacitor C3 in the current regulation circuit 33A is provided. In the meantime, the connections of the current consuming unit 32 and the current regulation circuit 33A are the same as the inner lamp unit 1 of FIG. 12.

Also in the first modified embodiment, the regulating current Id is added in the normal state and the regulating current Id is stopped in the disconnection state of one lamp unit, so that the difference between the supply current values from the corresponding port p in the normal state and in the disconnection state of one lamp unit is increased.

Also in this case, when the disconnection occurs, the light emitting unit of the lamp unit where the disconnection occurred is forcibly kept at the lights-out state. Further, in this case, even when the disconnection occurs in one lamp unit, the lamp unit where the disconnection has not occurred is kept at the state, in which the light emission driving circuit can enable the light source to emit the light, by the control circuit 17 or the control circuit 27.

Figure 14:
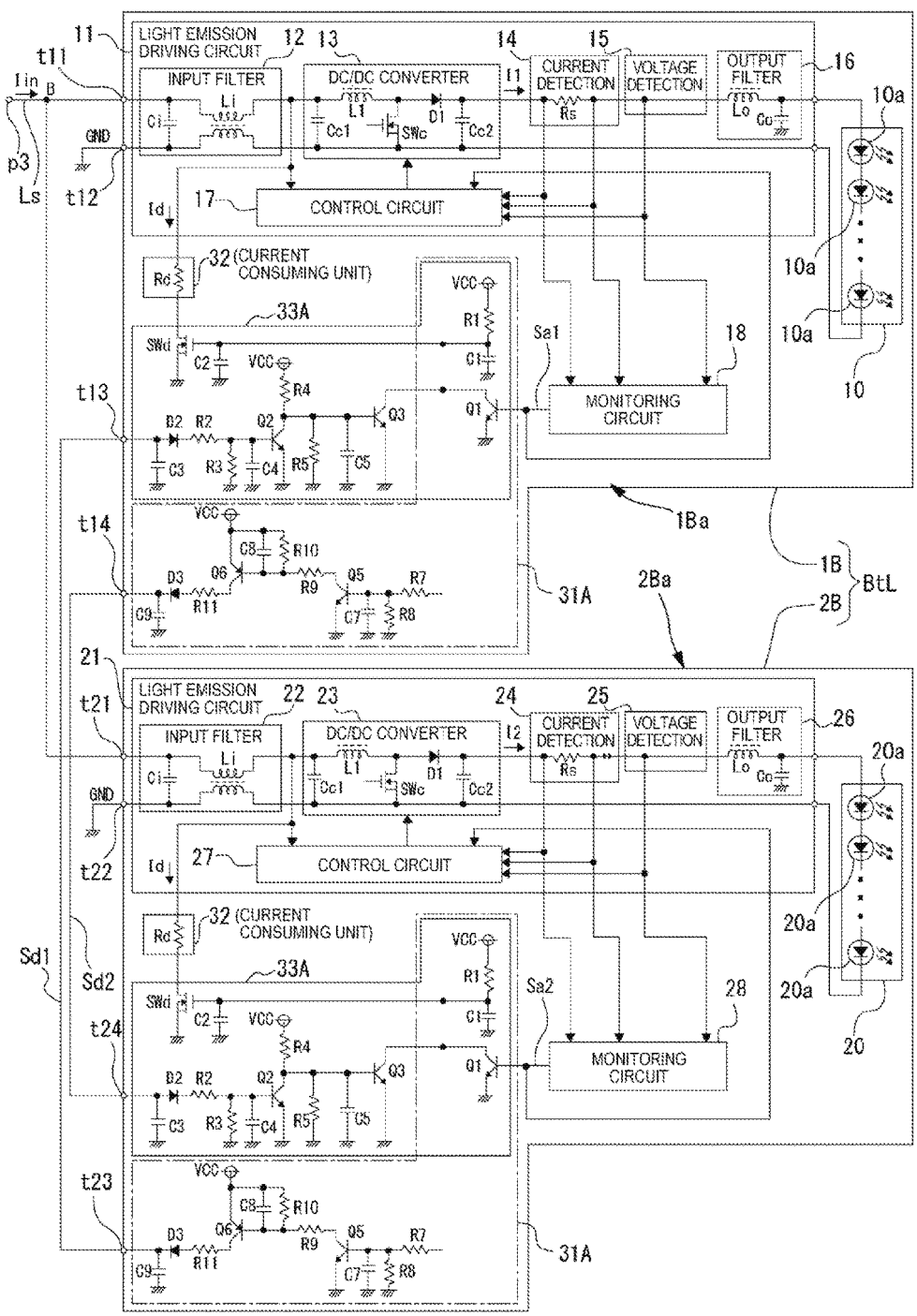
FIG. 14 is a circuit diagram depicting a circuit configuration in a turn signal lamp having a light source lighting circuit of a second modified embodiment of the third illustrative embodiment.

Also, the current consuming unit 32 and the current regulation circuit 33A may be provided for both the lamp units, as shown in FIG. 14.

FIG. 14 is a circuit diagram depicting an internal circuit configuration of the left and rear turn lamp BtL in accordance with a second modified embodiment. In the left and rear turn lamp BtL of the second modified embodiment, an inner lamp unit 1B where the current consuming unit 32, the current regulation circuit 33A and the notification signal input terminal t13 are added to the inner lamp unit 1A of FIG. 13 and an outer lamp unit 2B where the notification signal output circuit 31A and the notification signal output terminal t23 are added to the outer lamp unit 2A of FIG. 13 are provided.

In each of the lighting circuit 1Ba of the inner lamp unit 1B and the lighting circuit 2Ba of the outer lamp unit 2B, the transistor Q4, the serial connection circuit of the resistance R6 and the capacitor C6 and the power supply voltage VCC (FIG. 13) of the notification signal output circuit 31A are used in common with the transistor Q1, the serial connection circuit of the resistance R1 and the capacitor C1 and the power supply voltage VCC of the current regulation circuit 33A.

In the second modified embodiment, when the disconnection occurs in the inner lamp unit 1B, the state signal Sa1 of the monitoring circuit 18 indicates an abnormality, so that the regulating current Id being added at the inner lamp unit 1B-side is stopped and the notification signal Sd2 indicative of an abnormality is output to the outer lamp unit 2B by the notification signal output circuit 31A. In response to the notification signal Sd2, the regulating current Id being added at the outer lamp unit 2B-side is also stopped by the current regulation circuit 33A of the outer lamp unit 2B. Also, in the second modified embodiment, in response to the state signal Sa1 of the monitoring circuit 18 indicative of an abnormality, the control circuit 17 forcibly stops the light emission driving of the light emission driving circuit 11 and thereafter the light emitting unit 10 is forcibly kept at the lights-out state.

On the other hand, when the disconnection occurs in the outer lamp unit 2B, the state signal Sa2 of the monitoring circuit 28 indicates an abnormality, so that the regulating current Id being added at the outer lamp unit 2B-side is stopped and the notification signal Sd1 indicative of an abnormality is output to the inner lamp unit 1B by the notification signal output circuit 31A. In response to the notification signal Sd1, the regulating current Id being added at the inner lamp unit 1B-side is also stopped by the current regulation circuit 33A of the inner lamp unit 1B. Also, the control circuit 27 forcibly stops the light emission driving of the light emission driving circuit 21 and thereafter the light emitting unit 20 is forcibly kept at the lights-out state.

Also in the second modified embodiment, even when the disconnection occurs in one lamp unit, the lamp unit where the disconnection has not occurred is kept at the state, in which the light emission driving circuit can enable the light source to emit the light, by the control circuit 17 or the control circuit 27. This is the same as the first modified embodiment and the configuration of FIG. 6.

According to the second modified embodiment, the regulating current Id is added in the normal state and both the regulating currents Id are stopped in the disconnection state of one lamp unit, so that the difference between the supply current values from the port p in the normal state and in the disconnection state of one lamp unit is increased.

Meanwhile, in the second modified embodiment, the current value of the regulating current Id that is to be added at the inner lamp unit 1B-side and the current value of the regulating current Id that is to be added at the outer lamp unit 2B-side are preferably set so that a summed value thereof coincides with the current value of the regulating current Id, which is to be added in the first modified embodiment or the configuration of FIG. 12. For example, when the current value of the regulating current Id of 1.4 A is required, like the above example, the setting is made so that the inner lamp unit 1B-side is 0.7 A and the outer lamp unit 2B-side is 0.7 A, for example.

In the above, the case where the current value of the regulating current Id is lowered to zero (0) has been exemplified. However, the amount of decrease in the regulating current Id is arbitrary and is not limited to zero (0).

As described above, the light source lighting circuit of the third illustrative embodiment is a light source lighting circuit provided with a first lighting circuit configured to receive current from an electric power supply line (Ls) and to supply drive current to a first light source (one of the light emitting element 10*a* and the light emitting element 20*a*) and a second lighting circuit configured to receive current from the electric power supply line and to supply drive current to a second light source (the other of the light emitting element 10*a* and the light emitting element 20*a*), and includes a first current consuming unit (the current consuming unit 32) provided for the first lighting circuit and configured to consume a part of electric power to be supplied from the electric power supply line and to enable first regulating current to flow and a first monitoring circuit (one of the monitoring circuit 18 and the monitoring circuit 28) provided for the first lighting circuit and configured to monitor a state of the drive current flowing to the first light source and to generate a first state signal.

Also, the light source lighting circuit includes a second monitoring circuit (the other of the monitoring circuit 18 and the monitoring circuit 28) provided for the second lighting circuit and configured to monitor a state of the drive current flowing to the second light source and to generate a second state signal, a first notification signal output circuit (the notification signal output circuit 31A) provided for the second lighting circuit and configured to output a first notification signal (one of the notification signal Sd1 and the notification signal Sd2) corresponding to the second state signal to the first lighting circuit, and a first current regulation circuit (the current regulation circuit 33A), which is provided for the first lighting circuit, the first state signal and the first notification signal are to be input thereto and lowers a current value of the first regulating current when the first state signal indicates an abnormality or when the first notification signal indicates an abnormality.

Therefore, the first lighting circuit can generate a first state signal corresponding to a state of the drive current flowing to the first light source. The second lighting circuit can generate a second state signal corresponding to a state of the drive current flowing to the second light source and output a first notification signal corresponding to the second state signal to the first lighting circuit. When the first state signal indicates an abnormality or when the first notification signal indicates an abnormality, the first lighting circuit can lower a current value of the first regulating current.

With the above configuration, the difference between the supply current values in the common electric power supply line in the normal state where both the lamp units are not disconnected and in the disconnection state where at least one lamp unit is disconnected is increased, so that it is possible to appropriately perform the disconnection determination by the turn lamp ECU 100.

Also, the light source lighting circuit of the third illustrative embodiment includes a control circuit (the control circuit 17 or the control circuit 27) that keeps the first lighting circuit at a state where the first light source can emit the light, when the first state signal does not indicate an abnormality even though the first notification signal indicates an abnormality. Therefore, when the first state signal does not indicate an abnormality even though the first notification signal indicates an abnormality, the first lighting circuit is kept at a state where the first light source can emit the light.

With this configuration, the lamp unit where the disconnection has not occurred is kept at the state where the lighting circuit can enable the light source to emit the light, in response to the electric power supply from the electric power supply line.

If the light emission driving of the lamp unit where the disconnection has not occurred is forcibly stopped, both the lamp units may become at the non-light emission state, so that a driver or the like cannot easily check the lamp unit where the disconnection occurred. However, as described above, the lamp unit where the disconnection has not occurred is kept at the state where the light emission driving can be performed, so that a driver or the like can easily check the lamp unit where the disconnection occurred.

Also, the light source lighting circuit of the third illustrative embodiment has only the first current consuming unit, as the current consuming unit (refer to FIGS. 12 and 13).

With this configuration, the number of the current consuming units provided for the vehicle lamp is minimized, so that it is possible to reduce the number of circuit components and to save the cost.

Also, the light source lighting circuit of the third illustrative embodiment includes a second current consuming unit (the current consuming unit 32) provided for the second lighting circuit and configured to consume a part of the electric power to be supplied from the electric power supply line and to enable second regulating current to flow, a second notification signal output circuit (the notification signal output circuit 31A) provided for the first lighting circuit and configured to output a second notification signal (the other of the notification signal Sd1 and the notification signal Sd2) corresponding to the first state signal to the second lighting circuit, and a second current regulation circuit (the current regulation circuit 33A) that is provided for the second lighting circuit, the second state signal and the second notification signal are to be input thereto and lowers a current value of the second regulating current when the second state signal indicates an abnormality or when the second notification signal indicates an abnormality.

Therefore, the first lighting circuit is configured to output a second notification signal corresponding to the first state signal to the second lighting circuit. The second lighting circuit can lower a current value of the second regulating current when the second state signal indicates an abnormality or when the second notification signal indicates an abnormality.

With this configuration, the current consuming units are dispersedly arranged in the two lamp units.

Since the current consuming unit consumes the supplied electric power as heat, if the current consuming unit is mounted in only one lamp unit, the amount of heat generation increases, so that it is necessary to secure a space in the lamp unit, as countermeasures against heat, which may cause a design restriction of the lamp unit.

However, when the current consuming units are dispersedly arranged in the two lamp units, as described above, it is possible to reduce the space, as countermeasures against heat, so that it is possible to relax the design restriction.

Also, in the light source lighting circuit of the third illustrative embodiment, the first lighting circuit includes a first DC/DC converter 13 having a first switching element, and the second lighting circuit includes a second DC/DC converter 23 having a second switching element.

The DC/DC converter has a relatively less amount of heat generation.

Therefore, it is advantageous when providing the current consuming unit accompanied by heat. Also, since the amount of heat generation is less, it is possible to simplify the configuration for countermeasures against heat, so that it is possible to suppress an increase in cost.

Also, the turn signal lamp of the third illustrative embodiment includes a first lamp unit attached to a door part provided to be freely openable and closable for a vehicle main body part at a rear end portion of a vehicle, and a second lamp unit attached to the vehicle main body part-side and positioned at an outermore side than the first lamp unit in a width direction of the vehicle. The first lamp unit includes a first lighting circuit and a first light emitting unit defined in claim 1, and the second lamp unit includes a second lighting circuit and a second light emitting unit defined in claim 1.

With this configuration, it is possible to appropriately perform the disconnection determination for the turn signal lamp in which the respective lamp units are dispersedly arranged at the vehicle main body part and the door part.

Also, since a light emitting frequency of the turn signal lamp is relatively low, a chance that the electric power will be consumed by the current consuming unit is also relatively low, which is advantageous to the power consumption.

Fourth Illustrative Embodiment

In the below, a light source lighting circuit and a turn signal lamp of a fourth illustrative embodiment are described.

In the fourth illustrative embodiment, each of the left and rear turn lamp BtL and the right and rear turn lamp BtR has only one light source lighting circuit for turning on the turn lamp, instead of a plurality of the lamp units each of which has the light source lighting circuit, like the third illustrative embodiment.

As can be understood from FIG. 1, the left and rear turn lamp BtL and the right and rear turn lamp BtR correspond to a pair of lamps of which the electric power supply from the vehicle-side is individually controlled.

In below descriptions, it is presumed that the turn lamp ECU 100 of the fourth illustrative embodiment performs the disconnection determination corresponding to the supply current value to the turn lamp for each port p upon the turn lighting (i.e., blinking of one of the right and left lamps), like the third illustrative embodiment, but does not perform the disconnection determination upon the hazard lighting (i.e., blinking of the right and left lamps).

Also, in the fourth illustrative embodiment, the left and rear turn lamp BtL and the right and rear turn lamp BtR are turn lamps for a commercial vehicle such as a truck, and the battery voltage B is about 24V, for example.

In the below, as the turn lamp of the fourth illustrative embodiment, a configuration of the left and rear turn lamp BtL is representatively described. Since a configuration of the right and rear turn lamp BtR is the same as that of the left and rear turn lamp BtL, the descriptions thereof are omitted.

Figure 15:
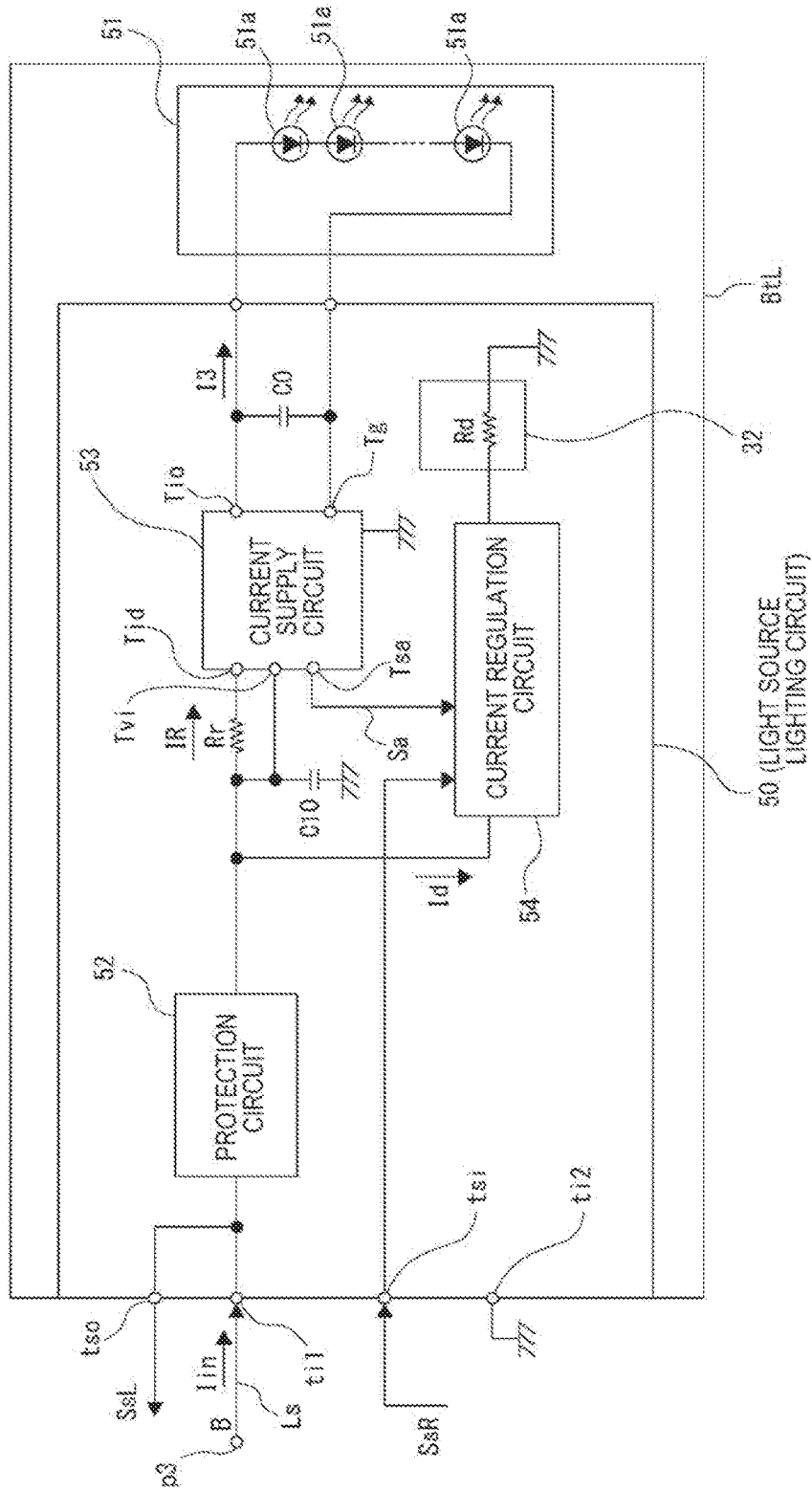
FIG. 15 illustrates a light source lighting circuit and a turn signal lamp of a fourth illustrative embodiment.

FIG. 15 depicts a circuit configuration in the left and rear turn lamp BtL of the fourth illustrative embodiment.

In this case, the left and rear turn lamp BtL has a light source lighting circuit 50 and a light emitting unit 51. In the light emitting unit 51, for example, LEDs are used as light emitting elements 51a, like the light emitting units 10, 20, and a serial connection circuit having a plurality of light emitting elements 51a connected in series is provided.

The light source lighting circuit 50 has a protection circuit 52, a current limiting resistance Rr, a capacitor C10, a current supply circuit 53, an output capacitor CO, a current regulation circuit 54, a current consuming unit 32, a positive electrode-side input terminal ti1, a GND terminal ti2 grounded to the earth, a state signal output terminal tso and a state signal input terminal tsi.

The positive electrode-side input terminal ti1 is connected to the port p3 of the turn lamp ECU 100, so that the battery voltage B can be supplied thereto.

The state signal output terminal tso is configured to output an electric power supply state signal Ss, which indicates whether or not the electric power supply from the turn lamp ECU 100, to the light source lighting circuit 50 of the right and rear turn lamp BtR. In the fourth illustrative embodiment, as the electric power supply state signal Ss, the battery voltage B (the power supply voltage) that is to be supplied from the turn lamp ECU 100 to the light source lighting circuit 50 is branched and output from the state signal output terminal tsi.

Meanwhile, hereinafter, the electric power supply state signal Ss that is to be output from the state signal output terminal tso of the left and rear turn lamp BtL is referred to as "electric power supply state signal SsL" and the electric power supply state signal Ss that is to be output from the state signal output terminal tso of the right and rear turn lamp BtR is referred to as "electric power supply state signal SsR".

An electric power supply state signal SsR that is to be output from the state signal output terminal tso of the right and rear turn lamp BtR is input (received at) to the state signal input terminal tsi. The input electric power supply state signal SsR is supplied to the current regulation circuit 54.

Herein, the electric power supply state signal Ss that is to be received at the state signal input terminal tsi functions as a signal indicating (notifying) whether the other lamp is turned on in each of the left and rear turn lamp BtL and the right and rear turn lamp BtR. When it is detected that the other lamp is turned on, the left and rear turn lamp BtL and the right and rear turn lamp BtR are in a hazard lighting state (because the detection can be performed as the electric power is supplied to one lamp). Also, when it is detected that the other lamp is not turned on, only one lamp is in the lighted state (turn lighting state). As can be understood from this, the electric power supply state signal Ss functions as a mode signal indicating whether a lighting mode is a turn lighting mode or a hazard lighting mode.

The protection circuit 52 is configured by a reverse connection protection circuit for protection against reverse connection, a surge protection circuit for surge protection and an overvoltage protection circuit. The overvoltage protection circuit has an overvoltage protection switch for interrupting an overvoltage when it is applied, and the overvoltage protection switch is ON in a usual state and OFF in an overvoltage state. Specifically, the overvoltage protection circuit has a circuit configuration where it is monitored whether the battery voltage B input via the positive electrode-side input terminal ti1 is an overvoltage (for example, 36V or higher) and the overvoltage protection switch becomes OFF when the overvoltage is detected. The overvoltage protection switch becomes OFF, so that the current supply circuit 53 is separated from the input line of the battery voltage B and the light emitting unit 51 is thus not driven. That is, the excessive voltage is prevented from being applied to each light emitting element 51a, so that each light emitting element 51a is protected.

The current limiting resistance Rr is inserted in series between the protection circuit 52 and the current supply circuit 53 on the input line of the battery voltage B. One end of the current limiting resistance Rr is grounded to the earth via the capacitor C10, and the other end is connected to a current detection terminal Tid of the current supply circuit 53.

The current supply circuit 53 is an IC (Integrated Circuit) for driving light sources, and has functions of driving the light emitting elements 51a in a constant current manner and detecting an abnormality of the drive current. The current supply circuit 53 has the current detection terminal Tid, an operating voltage input terminal Tvi, a current output terminal Tio, a GND terminal Tg and a state signal terminal Tsa. The operating voltage input terminal Tvi is connected to a connection point of one end of the current limiting resistance Rr and a positive electrode terminal of the capacitor C10, so that the current supply circuit 53 can supply the battery voltage B, as an operating voltage.

The current output terminal Tio is connected to an anode of the light emitting element 51a of the light emitting unit 51 positioned closest to one end-side, and the GND terminal Tg is connected to a cathode of the light emitting element 51a of the light emitting unit 51 positioned closest to the other end-side.

Herein, the output capacitor CO is inserted between a connection point of the current output terminal Tio and the anode of the light emitting element 51a positioned closest to one end-side and a connection point of the GND terminal Tg and the cathode of the light emitting element 51a positioned closest to the other end-side, and is connected in parallel with the light emitting unit 51.

As the battery voltage B is supplied from the port p3, an output voltage of the current supply circuit 53 is obtained as a voltage between both ends of the output capacitor CO and is applied, as a drive voltage, to a serial connection circuit of the plurality of light emitting elements 51a in the light emitting unit 51. Thereby, each light emitting element 51a emits the light, so that the drive current I3 flows.

At this time, when the battery voltage B is supplied from the port p3, the current detection terminal Tid of the current supply circuit 53 is input with limit current Ir via the current limiting resistance Rr. The current supply circuit 53 is configured to constantly control a current value of the drive current I3 by consuming a part of the limit current Ir as heat, in correspondence to a difference between a current value of the limit current Ir and a predetermined reference value. Thereby, the light emitting element 51a is driven in the constant current manner.

Also, the current supply circuit 53 is configured to monitor the current value of the drive current I3 and to generate a state signal Sa indicative of a state of the drive current I3. In this case, as the state signal Sa, an L level signal, which is indicative of an abnormality when the disconnection occurs in the light emitting unit 51 and the current value of the drive current I3 becomes zero (0), is output, and in the other case (normal state), an H level signal is output. The state signal Sa is input to the current regulation circuit 54.

Meanwhile, in the below, the state signal Sa is referred to as "drive state signal Sa" so as to distinguish the electric power supply state signal Ss.

Figure 16:
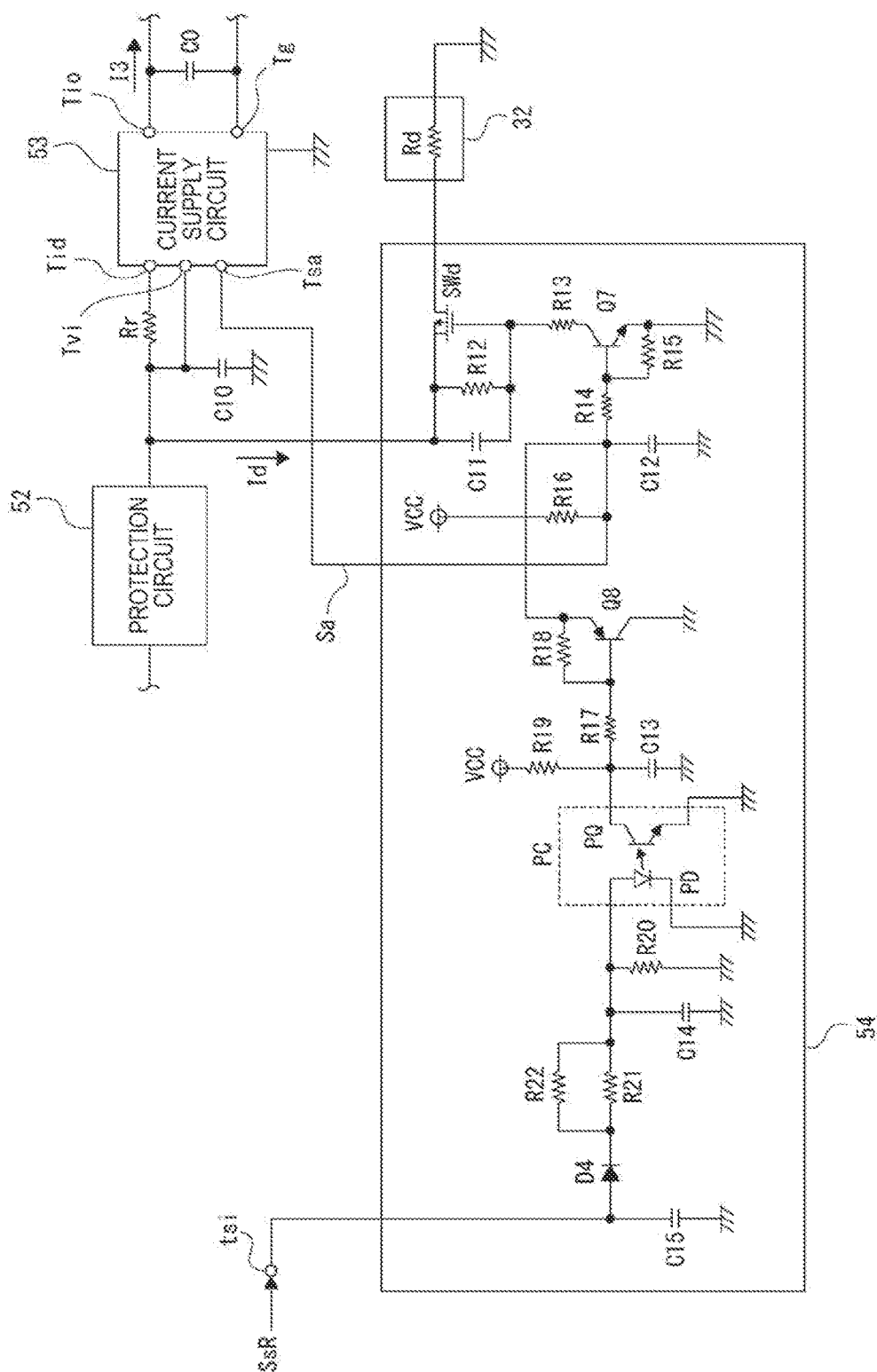
FIG. 16 illustrates a current regulation circuit of the fourth illustrative embodiment.

The current regulation circuit 54 is described with reference to FIG. 16.

the current regulation circuit 54 has a switch SWd, a capacitor C11, a capacitor C12, a resistance R12, a resistance R13, a transistor Q7, a resistance R14, a resistance R15, a resistance R16, a transistor Q8, a resistance R17, a resistance R18, a resistance R19, a capacitor C13, a photo-coupler PC, a resistance R20, a capacitor C14, a resistance R21, a resistance R22, a diode D4 and a capacitor C15.

The switch SWd is a P-type MOSFET, for example, and a source is connected to one end of the current limiting resistance Rr and a drain is grounded to the earth via the dummy resistance Rd in the current consuming unit 32. A parallel connection circuit configured by the capacitor C11 and the resistance R12 is inserted between a gate and the source of the switch SWd.

One end of the resistance R13 is connected to a connection point of the gate of the switch SWd and the capacitor C11, and the other end of the resistance R13 is connected to a collector of the transistor Q7, which is an NPN-type bipolar transistor, for example. An emitter of the transistor Q7 is grounded to the earth and a base thereof is connected to the state signal terminal Tsa of the current supply circuit 53 via the resistance R14. The resistance R15 having one end connected to one end of the resistance R14 and the other end grounded to the earth is inserted between the base and the emitter of the transistor Q7.

The capacitor C12 is inserted between the other end of the resistance R14 and the earth, and a connection point of the resistance R14 and the capacitor C12 is connected to the power supply voltage VCC via the resistance R16. In the meantime, the power supply voltage VCC is a voltage input by branching the battery voltage B from the port p3.

Also, a connection point of the other end of the resistance R14 and the capacitor C12 is connected to an emitter of the transistor Q8, which is a PNP-type bipolar transistor, for example. A collector of the transistor Q8 is grounded to the earth and a base is connected to one end of the resistance R17. The resistance R18 having one end connected to one end of the resistance R17 and the other end connected to the emitter of the transistor Q8 is inserted between the base and the emitter of the transistor Q8.

The capacitor C13 is inserted between the other end of the resistance R17 and the earth, and a connection point of the resistance R17 and the capacitor C13 is connected to the power supply voltage VCC via the resistance R19.

Also, a connection point of the other end of the resistance R17 and the capacitor C13 is connected to a collector of a photo transistor PQ (for example, an NPN-type) of the photo-coupler PC. An emitter of the photo transistor PQ is grounded to the earth.

In the photo-coupler PC, a cathode of the photo diode PD is grounded to the earth and an anode thereof is connected to a cathode of the diode D4 via the resistance R21. An anode of the diode D4 is connected to the state signal input terminal tsi.

A parallel connection circuit configured the resistance R20 and the capacitor C14 is inserted between a connection point of the anode of the photo diode PD and the resistance R21 and the earth. Also, the resistance R22 is connected in parallel with the resistance R21, and the capacitor C15 is inserted between a connection point of the anode of the diode D4 and the state signal input terminal tsi and the earth.

In the current regulation circuit 54 configured as described above, when the switch SWd becomes ON, the regulating current Id flows from the input line of the battery voltage B via the dummy resistance Rd. The current regulation circuit 54 is configured to regulate a current value of the regulating current Id, based on the drive state signal Sa that is to be output from the current supply circuit 53 and the electric power supply state signal SsR that is to be input from the state signal input terminal tsi (the electric power supply state signal Ss that is to be output from the right and rear turn lamp BtR).

In the below, a current value control operation of the regulating current Id that is to be performed by the current regulation circuit 54 is described.

First, in a state where the electric power supply state signal SsR is an L level (a state where it is indicated that the right and rear turn lamp BtR is not supplied with the electric power), a case where the disconnection does not occur in the light emitting unit 51 and the drive state signal Sa does not indicate an abnormality (H level) and a case where the drive state signal indicates an abnormality (L level) are respectively described.

In the meantime, the current regulation circuit 54 is configured to operate by using the battery voltage B from the port p3 as an operating power supply. Therefore, the operation that is described below is an operation that is performed while the battery voltage B is supplied from the port p3.

First, in the state where the electric power supply state signal SsR is an L level, the photo transistor PQ is at an OFF state, so that a positive voltage, which is generated in the capacitor C13 on the basis of the power supply voltage VCC, is applied to the base of the transistor Q8 (PNP-type) and thus the transistor Q8 becomes OFF.

When the disconnection does not occur in the light emitting unit 51 and the drive state signal Sa is an H level, a voltage, which is generated in the capacitor C12 on the basis of the power supply voltage VCC, is applied to the base of the transistor Q7 and thus the transistor Q7 becomes ON. When the transistor Q7 becomes ON, the current flows from the input line of the battery voltage B via the collector and emitter of the transistor Q7, so that a voltage between the gate and the source of the switch SWd is lowered and the switch SWd (P-type MOSFET) becomes ON.

Like this, when the disconnection does not occur in the light emitting unit 51, the switch SWd becomes ON, so that the regulating current Id flows.

On the other hand, when the disconnection occurs in the light emitting unit 51 and the drive state signal Sa becomes an L level, the charging based on the power supply voltage VCC is not performed in the capacitor C12 and the base voltage is not applied to the transistor Q7, so that the transistor Q7 becomes OFF. When the transistor Q7 becomes OFF, the voltage applied between the gate and the source of the switch SWd increases, so that the switch SWd becomes OFF and the regulating current Id is stopped.

Like this, when the disconnection occurs in the light emitting unit 51 in the state where the electric power supply state signal SsR is an L level, i.e., upon the turn lighting where only the left turn lamp is blinked, for example, the regulating current Id is stopped. That is, also in the fourth illustrative embodiment, upon the turn lighting, the difference between the supply current values from the port p3 in the normal state and the disconnection state is increased, so that it is possible to appropriately perform the disconnection determination even with the turn lamp ECU 100 where a determination threshold value for incandescent lamp is used.

Subsequently, the operation that is performed when the electric power supply state signal SsR becomes an H level, i.e., upon the hazard lighting is described. In the meantime, for convenience of descriptions, it is assumed that the drive state signal Sa is an H level indicative of the normal state.

When the current supply state signal SsR becomes an H level, the photo transistor PQ becomes ON, so that the current based on the power supply voltage VCC flows via the collector and emitter of the photo transistor PQ. Also, the base voltage of the transistor Q8 is lowered and the transistor Q8 becomes ON. When the transistor Q8 becomes ON, the base voltage of the transistor Q7 is lowered, so that the transistor Q7 becomes OFF and the switch SWd becomes OFF, too.

Therefore, upon the hazard lighting where both the right and left turn lamps are blinked, the regulating current Id is stopped.

On the other hand, when the drive state signal Sa becomes an L level due to the disconnection in the light emitting unit 51 and the electric power supply state signal SsR is an H level, the transistor Q7 becomes OFF, so that the switch SWd also becomes OFF and the regulating current Id is stopped.

Herein, the case where the electric power supply state signal SsR output from the light source lighting circuit 50 of the right and rear turn lamp BtR is input via the photo-coupler PC has been exemplified. However, the corresponding signal may also be input via the other insulation-type signal transmission element (an element configured to transmit a signal while securing an electrical insulation state). In the case where a signal is to be treated by direct current, like the fourth illustrative embodiment, a photo interrupter and the like may be exemplified as the other insulation-type signal transmission element.

As described above, the light source lighting circuit (the light source lighting circuit 50) of the fourth illustrative embodiment is a light source lighting circuit provided for a pair of lamps (the left and rear turn lamp BtL and the right and rear turn lamp BtR) of which electric power supply from a vehicle-side is individually controlled, and includes a light source driving unit (the current supply circuit 53) configured to enable drive current (I3) to flow to a light source (the light emitting elements 51a) on the basis of the electric power to be supplied from the vehicle-side, a current consuming unit (the current consuming unit 32) configured to consume a part of the electric power to be supplied from the vehicle-side and to enable regulating current to flow, and a monitoring unit (the current supply circuit 53) configured to monitor a state of the drive current and to generate a drive state signal (Sa). Also, the light source lighting circuit includes a receiving unit (the state signal input terminal Tsi) configured to receive a mode signal (the electric power supply state signal Ss) indicative of a lighting/lights-out state of the other lamp from the other lamp and a current regulation circuit (the current regulation circuit 54) configured to lower a current value of the regulating current in each of a case where the drive state signal indicates an abnormality and a case where the mode signal indicates a lighting state.

That is, the current regulation circuit 54 is configured to receive a drive state signal (Sa) corresponding to a state of the drive current and a mode signal (the electric power supply state signal Ss) indicative of a lighting/lights-out state of the other lamp from the other lamp and lowers a current value of the regulating current in each of a case where the drive state signal indicates an abnormality and a case where the mode signal indicates a lighting state.

With this configuration, in each of the pair of lamps, the current value of the regulating current is lowered when the lamp is in the disconnection state. Thereby, a difference between the supply current values from the vehicle-side (ECU-side) is increased. That is, when one of the lamps is turned on such as turn lighting, it is possible to appropriately perform the disconnection determination by the ECU of the related art based on the assumption of an incandescent lamp.

According to the above configuration, when the pair of lamps is turned on at the same time, the electric power consumption in both the lamps is reduced as the current value of the regulating current is lowered. That is, it is possible to reduce the electric power consumption in both the lamps, in correspondence to a case where the simultaneous lighting such as hazard lighting is periodically repeated (or the simultaneous lighting may continue) for a relatively long time period.

As described above, according to the light source lighting circuit of the fourth illustrative embodiment, while it is possible to perform the disconnection determination upon the lighting of one lamp for the pair of lamps of which the electric power supply from the vehicle-side is individually controlled, it is possible to reduce the power consumption and the amount of heat generation when both the lamps are turned on at the same time, to decrease a possibility that a battery will be dead in the vehicle, and to reduce the manufacturing cost of the lamp.

Also, in the light source lighting circuit of the fourth illustrative embodiment, the current regulation circuit is input with the mode signal, which is received by the receiving unit, via the insulation-type signal transmission element.

That is, the current regulation circuit 54 has a configuration where the mode signal (the electric power supply state signal Ss) is input via the insulation-type signal transmission element (photo-coupler PC) and the transistors Q8, Q7 are ON/OFF-controlled to regulate the regulating current.

With this configuration, when an abnormality such as a shortcut occurs in a transmission path of the mode signal, it is possible to exclude an influence of the abnormality. Also, it is possible to block an extraneous noise occurring in the transmission path, so that it is possible to prevent a malfunction, which is to be caused due to the noise.

Also, the turn signal lamp of the fourth illustrative embodiment includes the light source lighting circuit and the light source of the fourth illustrative embodiment, and the light source lighting circuit is configured to branch a power supply voltage to be supplied from the vehicle-side and to output the same to the other lamp, as a mode signal (the electric power supply state signal Ss) indicative of a lighting/lights-out state of one lamp.

That is, as shown in FIG. 15, the battery voltage B (the power supply voltage) to be supplied from the turn lamp ECU 100 to the light source lighting circuit 50 is branched and used as the electric power supply state signal Ss (SsL in FIG. 15) and is output from the state signal output terminal tso to the light source lighting circuit 50 of the right and rear turn lamp BtR.

With this configuration, it is possible to reduce the power consumption and the amount of heat generation upon the hazard lighting. Also, a configuration for notifying whether it is a lighting state between both the lamps can be made by the configuration of branching and outputting the power supply voltage from the vehicle-side, so that it is possible to simplify a circuit configuration, to reduce a circuit area and to save the cost.

Meanwhile, in the fourth illustrative embodiment, the present invention has been applied to the left and rear turn lamp BtL and the right and rear turn lamp BtR. However, the present invention can be favorably applied to the left and front turn lamp FtL and the right and front turn lamp FtR, too.

Also, in the fourth illustrative embodiment, the method of regulating the regulating current Id, i.e., the method of lowering the current value of the regulating current Id in each of the case where the drive state signal Sa indicates an abnormality and the case where the mode signal (the electric power supply state signal Ss) output from the light source lighting circuit of the other lamp (the other lamp of the right and left lamps) indicates the lighting state can also be favorably applied to the case where one turn signal lamp is divided to a plurality of lamp units, like the third illustrative embodiment.

Modified Embodiments

In the meantime, the present invention is not limited to the above specific examples, and a variety of modified embodiments can also be made.

For example, although particularly not mentioned in the above, the light source lighting circuit and the turn signal lamp of the present invention can be favorably applied to a case where the sequential lighting is performed, too. For example, in the case of the third illustrative embodiment, a configuration where while the inner lamp unit 1, 1A, 1B sequentially turns on the light emitting elements 10a, the outer lamp unit 2, 2A, 2B turns on all the light emitting elements 20a at the same time after all the light emitting elements 10a are turned on by the inner lamp unit 1, 1A, 1B can be exemplified. In this case, in the inner lamp unit 1, 1A, 1B, each light emitting element 10a is connected in parallel with the bypass switch and the bypass switches are sequentially turned on, so that the light emitting elements 10a are sequentially turned on.

Also, in the above, the number of the lamp units of the turn signal lamp of the present invention and the number of the lighting circuits of the light source lighting circuit of the present invention have been exemplified as two, respectively. However, the number of the lamp units and the number of the lighting circuits may be three or more.

Also, in the above, the case where the resistance element is used to generate the regulating current Id has been exemplified. However, as the means for generating the regulating current Id, in addition to the resistance element, a constant current circuit using a transistor, for example, may also be used without particular limit inasmuch as it is a means for consuming the electric power.

Also, in the above, the case where the light emission driving of the disconnected lamp unit is forcibly stopped has been exemplified. However, the corresponding configuration is not necessarily required.

The light source lighting circuit of the present invention can be applied to the other vehicle lamps, in addition to the turn signal lamp.

The invention claimed is:

1. A light source lighting circuit comprising:
a first lighting circuit having a first light emission driving circuit configured to receive current from an electric power supply line and to supply drive current to a first light source, and
a second lighting circuit having a second light emission driving circuit configured to receive current from the electric power supply line and to supply drive current to a second light source,
wherein the first lighting circuit is configured to generate a first state signal corresponding to a state of the drive current flowing to the first light source and to output a second notification signal corresponding to the first state signal to the second lighting circuit,
wherein the second lighting circuit is configured to generate a second state signal corresponding to a state of the drive current flowing to the second light source and to output a first notification signal corresponding to the second state signal to the first lighting circuit,
wherein when the first state signal indicates an abnormality or when the first notification signal indicates an abnormality, the first lighting circuit stops operation thereof, and
wherein when the second state signal indicates an abnormality or when the second notification signal indicates an abnormality, the second lighting circuit stops operation thereof.

2. The light source lighting circuit according to claim 1, wherein the first lighting circuit comprises a current consuming unit configured to consume a part of the electric power to be supplied from the electric power supply line and to enable regulating current to flow, and lowers a current value of the regulating current when the first state signal indicates an abnormality or when the first notification signal indicates an abnormality.

3. A turn signal lamp comprising:
a first lamp unit attached to a door part provided to be freely openable and closable for a vehicle main body part at a rear end portion of a vehicle, and
a second lamp unit attached to the vehicle main body part-side and positioned at an outermore side than the first lamp unit in a width direction of the vehicle,
wherein the first lamp unit comprises a first light emitting unit and the first lighting circuit of claim 1, and
wherein the second lamp unit comprises a second light emitting unit and the second lighting circuit of claim 1.

4. A light source lighting circuit comprising:
a first lighting circuit having a first light emission driving circuit configured to turn on a plurality of light sources of a first light emitting unit on the basis of an input voltage, and
a second lighting circuit having a second light emission driving circuit configured to turn on a light source of a second light emitting unit on the basis of an input voltage,
wherein the first lighting circuit having a sequential circuit configured:
to sequentially turn on the light sources of the first light emitting unit in accordance with a timing signal, and
to output the timing signal to the second lighting circuit, and
wherein the second lighting circuit is configured to start lighting of the light source of the second light emitting unit in accordance with the timing signal.

5. The light source lighting circuit according to claim 4, wherein the second light emitting unit comprises a plurality of light sources, and
wherein the second lighting circuit is configured to start sequential lighting of the light sources of the second light emitting unit in accordance with the timing signal.

6. The light source lighting circuit according to claim 4, wherein the first lighting circuit and the second lighting circuit are configured to turn on the corresponding light sources by receiving current from a common electric power supply line,
wherein the first lighting circuit is configured to generate a state signal corresponding to a state of drive current flowing to the light sources of the first light emitting unit and to output a notification signal corresponding to the state signal to the second lighting circuit,
wherein the second lighting circuit stops operation thereof or lowers a current value of regulating current flowing to a current consuming unit configured to consume a part of electric power to be supplied from the electric power supply line when the notification signal indicates an abnormality, and
wherein the first lighting circuit is configured to output the timing signal through an output line of the notification signal.

7. A turn signal lamp comprising:
a first lamp unit attached to a door part provided to be freely openable and closable for a vehicle main body part at a rear end portion of a vehicle, and
a second lamp unit attached to the vehicle main body part-side and positioned at an outermore side than the first lamp unit in a width direction of the vehicle
wherein the first lamp unit comprises the first lighting circuit and the first light emitting unit according to claim 4, and
wherein the second lamp unit comprises the second lighting circuit and the second light emitting unit according to claim 4.

8. A light source lighting circuit comprising:
a first lighting circuit having a first light emission driving circuit configured to receive current from an electric power supply line and to supply drive current to a first light source;
a second lighting circuit having a first light emission driving circuit configured to receive current from the electric power supply line and to supply drive current to a second light source, and
a first current consuming unit provided for the first lighting circuit and configured to consume a part of the electric power to be supplied from the electric power supply line and to enable first regulating current to flow,
wherein the first lighting circuit is configured to generate a first state signal corresponding to a state of the drive current flowing to the first light source,
wherein the second lighting circuit is configured to generate a second state signal corresponding to a state of the drive current flowing to the second light source and to output a first notification signal corresponding to the second state signal to the first lighting circuit, and
wherein when the first state signal indicates an abnormality or when the first notification signal indicates an abnormality, the first lighting circuit lowers a current value of the first regulating current.

9. The light source lighting circuit according to claim 8, wherein the light source lighting circuit keeps the first lighting circuit at a state where a light emission driving of the first light source is possible when the first state signal does not indicate an abnormality even though the first notification signal indicates an abnormality.

10. The light source lighting circuit according to claim 8 wherein only the first current consuming unit is provided as a current consuming unit.

11. The light source lighting circuit according to claim 8, further comprising a second current consuming unit provided for the second lighting circuit and configured to consume a part of the electric power to be supplied from the electric power supply line and to enable second regulating current to flow,
wherein the first lighting circuit is configured to output a second notification signal corresponding to the first state signal to the second lighting circuit, and
wherein when the second state signal indicates an abnormality or when the second notification signal indicates an abnormality, the second lighting circuit lowers a current value of the second regulating current.

12. The light source lighting circuit according to one of claim 1, wherein the first lighting circuit comprises a first DC/DC converter having a first switching element, and
wherein the second lighting circuit comprises a second DC/DC converter having a second switching element.

13. A turn signal lamp comprising:
a first lamp unit attached to a door part provided to be freely openable and closable for a vehicle main body part at a rear end portion of a vehicle, and
a second lamp unit attached to the vehicle main body part-side and positioned at an outermore side than the first lamp unit in a width direction of the vehicle,
wherein the first lamp unit comprises a first light emitting unit and the first lighting circuit of claim 8, and
wherein the second lamp unit comprises a second light emitting unit and the second lighting circuit of claim 8.

14. A light source lighting circuit provided for a pair of lamps of which electric power supply from a vehicle-side is individually controlled, the light source lighting circuit comprising:
a lighting circuit having a light emission driving circuit configured to enable drive current to flow to a light source on the basis of the electric power to be supplied from the vehicle-side;
a current consuming unit configured to consume a part of the electric power to be supplied from the vehicle-side and to enable regulating current to flow, and
a current regulation circuit configured to receive a drive state signal corresponding to a state of the drive current and a mode signal indicative of a lighting/lights-out state of the other lamp from the other lamp and to lower a current value of the regulating current in each of a case where the drive state signal indicates an abnormality and a case where the mode signal indicates a lighting state.

15. The light source lighting circuit according to claim 14, wherein the current regulation circuit is configured to use the mode signal for regulation of the regulating current via an insulation-type signal transmission element.

16. A turn signal lamp comprising the light source lighting circuit and the light sources according to claim 14, wherein the light source lighting circuit is configured to branch a power supply voltage to be supplied from the vehicle-side and to output the same to the other lamp, as a mode signal indicative of a lighting/lights-out state of the lamp.

* * * * *